(12) United States Patent
Koziarz

(10) Patent No.: US 9,846,825 B2
(45) Date of Patent: Dec. 19, 2017

(54) METHOD, APPARATUS AND SYSTEM FOR GENERATING AN INTERMEDIATE REGION-BASED REPRESENTATION OF A DOCUMENT

(71) Applicant: CANON KABUSHIKI KAISHA, Tokyo (JP)

(72) Inventor: Krzysztof Adam Koziarz, Denistone (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 14/572,327

(22) Filed: Dec. 16, 2014

(65) Prior Publication Data

US 2015/0170010 A1 Jun. 18, 2015

(30) Foreign Application Priority Data

Dec. 18, 2013 (AU) .............................. 2013273660

(51) Int. Cl.
*G06K 15/02* (2006.01)
*H04N 1/387* (2006.01)
*H04N 1/58* (2006.01)
*G06T 11/60* (2006.01)

(52) U.S. Cl.
CPC .......... *G06K 15/1855* (2013.01); *G06T 11/60* (2013.01); *H04N 1/387* (2013.01); *H04N 1/58* (2013.01)

(58) Field of Classification Search
None
See application file for complete search history.

(56) References Cited

U.S. PATENT DOCUMENTS

| 6,049,339 | A | 4/2000 | Schiller et al. |
| 7,978,196 | B2 | 7/2011 | Combes et al. |
| 8,132,096 | B1* | 3/2012 | Widdowson ........... H04N 1/387 382/209 |
| 2002/0015039 | A1* | 2/2002 | Moore ................... G06T 15/40 345/421 |
| 2003/0179200 | A1* | 9/2003 | Martin ................... G06T 11/40 345/428 |

(Continued)

*Primary Examiner* — Nicholas Pachol
(74) *Attorney, Agent, or Firm* — Canon U.S.A., Inc. IP Division

(57) ABSTRACT

A method of generating a region-based representation of a document is disclosed. A global compositing sequence is generated based on a predetermined rule, using fill data and at least one compositing operation associated with a plurality of objects of the document, to form an object-based representation of the document. The region-based representation of the document is generated based on a further compositing sequence determined for regions formed using the object-based representation. The method also determines whether at least one of the regions satisfies the predetermined rule using a relative arrangement of the objects in the object-based representation. Where the region satisfies the predetermined rule, a reference to the global compositing sequence is created. Where the region does not satisfy the predetermined rule, a local compositing sequence is generated using fill data and compositing operations associated with the objects contributing to the region.

18 Claims, 13 Drawing Sheets

(56) References Cited

U.S. PATENT DOCUMENTS

| | | | | |
|---|---|---|---|---|
| 2004/0189656 A1* | 9/2004 | Moore | G06T 15/80 | 345/589 |
| 2006/0066621 A1* | 3/2006 | Herceg | G06T 11/40 | 345/501 |
| 2006/0082596 A1* | 4/2006 | Karlov | G06T 11/40 | 345/629 |
| 2007/0126753 A1* | 6/2007 | Moore | G06T 15/503 | 345/592 |
| 2009/0009526 A1* | 1/2009 | Rice | G06T 11/40 | 345/589 |
| 2009/0295828 A1* | 12/2009 | Koziarz | G06T 11/40 | 345/619 |
| 2011/0122450 A1* | 5/2011 | Puckett | H04N 1/4052 | 358/3.06 |
| 2011/0148909 A1* | 6/2011 | Besley | G06T 1/00 | 345/592 |
| 2011/0299105 A1* | 12/2011 | Morrison | G06T 11/40 | 358/1.9 |
| 2012/0105911 A1* | 5/2012 | Belbin | G06F 3/122 | 358/1.15 |
| 2012/0288211 A1* | 11/2012 | Hitosugi | G06T 9/00 | 382/244 |
| 2012/0300256 A1* | 11/2012 | Moore | G06T 11/40 | 358/1.15 |
| 2013/0047162 A1* | 2/2013 | Stefanov | G06F 9/5033 | 718/102 |
| 2013/0155456 A1* | 6/2013 | Morrison | G06F 3/1296 | 358/1.15 |
| 2013/0169980 A1* | 7/2013 | Johnson | G06K 15/1836 | 358/1.8 |
| 2014/0152700 A1 | 6/2014 | Koziarz et al. | | |

* cited by examiner

METHOD, APPARATUS AND SYSTEM FOR GENERATING AN INTERMEDIATE REGION-BASED REPRESENTATION OF A DOCUMENT

REFERENCE TO RELATED PATENT APPLICATION(S)

This application claims the benefit under 35 U.S.C. §119 of the filing date of Australian Patent Application No. 2013273660, filed 18 Dec. 2013, hereby incorporated by reference in its entirety as if fully set forth herein.

TECHNICAL FIELD

The present invention relates generally to the field of computer graphics and, in particular, to a method, apparatus and system for generating an intermediate representation of a document such as a representation of a page. The present invention also relates to a computer program product including a computer readable medium having recorded thereon a computer program for generating an intermediate representation of a document.

BACKGROUND

The trend of achieving performance speedup through the use of multi-core and multi-processor architectures in computer systems, including printing systems, has gained widespread use in recent years. Multi-core and multi-processor architectures allow a number of threads belonging to one or more processes to execute in parallel across a number of CPUs, thereby reducing overall execution time.

In order to take advantage of such parallelism, a process is typically be broken down into "tasks". A task is a well-defined portion of the overall process to be performed on given input data to produce some output data. The tasks of a process are largely independent and able to be executed in parallel.

The tasks executed in a renderer sub-system of a printing system commonly process different groups of graphic objects to produce intermediate representations for different portions of an input page specification. For example, the page area may be subdivided into y-bands, x-bands or tiles, and a task is assigned to each subdivision to process that part of the page. Alternatively to or in addition to spatial subdivision, objects may be subdivided into sub-sequences in drawing order (commonly referred to as z order) to form z-bands. A task is assigned to process each z-band.

In some printing systems, sequences of objects are converted into an intermediate representation of the graphics represented by the objects. Other tasks then merge the intermediate representations to form a final representation of the entire page. The final representation is then rendered to pixels that can be displayed or printed on an output device.

One method of representing the intermediate representation of a page is to utilize the outlines of the objects to divide the page into regions separated by pixel aligned edges. Each region has a corresponding fill compositing sequence that describes the operations required to render the pixels in the region. The fill compositing sequence consists of a sequence of fills with corresponding compositing operators, which are derived from properties of the objects that contribute to the region.

For pages with complex contents, the number of regions can be large, and thus the set of all fill compositing sequences can grow large, even if duplicates are removed. If a page is split into many z-bands and/or y-bands (or tiles), then a large proportion of intermediate representations generated from the bands have regions referencing similar sets of fill compositing sequences. It is therefore beneficial to keep fill compositing sequences in a single database while generating the intermediate representations and the final page representation. However, if the single database of fill compositing sequences needs to be updated frequently by multiple tasks producing intermediate representations or tasks merging the intermediate representations of a page and executing in parallel on multiple threads, frequent "locking" is required. Locking is a method of synchronising access to a shared resource by multiple parallel threads of execution. If multiple threads require access to the shared resource at the same time, only one thread may access the resource while the other threads are suspended. Frequent locking impairs the performance of a multithreaded system.

It is a common goal of multi-threaded systems to minimise frequent synchronised access to shared resources (sets of fill compositing sequences) while also minimising data (fill compositing sequences) that is duplicated in order to be used by multiple threads without synchronisation. Existing methods cannot efficiently address this goal in a multi-threaded rendering system.

SUMMARY

It is an object of the present invention to substantially overcome, or at least ameliorate, one or more disadvantages of existing arrangements.

Disclosed are arrangements which seek to address the above problems by separating a fill compositing stack set (e.g. 550 in FIG. 5C) into several sets including a global compositing set (e.g. 590) and one or more fillmap compositing sets (e.g. 580 and 585 in FIG. 5D).

According to one aspect of the present disclosure, there is provided a method of generating a region-based representation of a document, the method comprising:

generating a global compositing sequence based on a predetermined rule, using fill data and at least one compositing operation associated with a plurality of objects of the document, to form an object-based representation of the document;

generating the region-based representation of the document based on a further compositing sequence determined for regions formed using the object-based representation;

determining whether at least one of said regions satisfies the predetermined rule using a relative arrangement of the objects in the object-based representation, and where said region satisfies the predetermined rule, creating a reference to the global compositing sequence, and where said region does not satisfy the predetermined rule, generating a local compositing sequence using fill data and compositing operations associated with the objects contributing to the region.

According to another aspect of the present disclosure, there is provided an apparatus for generating a region-based representation of a document, the apparatus comprising:

means for generating a global compositing sequence based on a predetermined rule, using fill data and at least one compositing operation associated with a plurality of objects of the document, to form an object-based representation of the document;

means for generating the region-based representation of the document based on a further compositing sequence determined for regions formed using the object-based representation;

means for determining whether at least one of said regions satisfies the predetermined rule using a relative arrangement of the objects in the object-based representation, and where said region satisfies the predetermined rule, creating a reference to the global compositing sequence, and where said region does not satisfy the predetermined rule, generating a local compositing sequence using fill data and compositing operations associated with the objects contributing to the region.

According to still another aspect of the present disclosure, there is provided a system for generating a region-based representation of a document, the system comprising:

a memory for storing data and a computer program;

a processor coupled to the memory for executing the computer program, the computer program comprising instructions for:

generating a global compositing sequence based on a predetermined rule, using fill data and at least one compositing operation associated with a plurality of objects of the document, to form an object-based representation of the document;

generating the region-based representation of the document based on a further compositing sequence determined for regions formed using the object-based representation;

determining whether at least one of said regions satisfies the predetermined rule using a relative arrangement of the objects in the object-based representation, and where said region satisfies the predetermined rule, creating a reference to the global compositing sequence, and where said region does not satisfy the predetermined rule, generating a local compositing sequence using fill data and compositing operations associated with the objects contributing to the region.

According to still another aspect of the present disclosure, there is provided a non-transitory computer readable memory having a program stored thereon for generating a region-based representation of a document, the program comprising:

code for generating a global compositing sequence based on a predetermined rule, using fill data and at least one compositing operation associated with a plurality of objects of the document, to form an object-based representation of the document;

code for generating the region-based representation of the document based on a further compositing sequence determined for regions formed using the object-based representation;

code for determining whether at least one of said regions satisfies the predetermined rule using a relative arrangement of the objects in the object-based representation, and where said region satisfies the predetermined rule, creating a reference to the global compositing sequence, and where said region does not satisfy the predetermined rule, generating a local compositing sequence using fill data and compositing operations associated with the objects contributing to the region in the object-based representation.

According to still another aspect of the present disclosure, there is provided a method of generating an intermediate representation of a document, the method comprising:

receiving a plurality of objects of the document with associated fill data and a drawing operation;

generating a global compositing sequence for at least one of said objects using the fill data and the compositing operation associated with said at least one object, the global compositing sequence being generated independently of a relative arrangement of said objects within the document, the generated global compositing sequence being stored in a first memory concurrently accessible by a plurality of program threads;

generating a further compositing sequence for regions of the document to generate the intermediate representation, said regions being determined based on relative arrangement of the objects within the document, creating a reference to a global compositing sequence stored in the first memory for at least one of said regions, the reference being created using the fill data of at least one contributing object of said at least one region; and generating a local compositing sequence for at least one further region of the document upon receiving contributing objects for said at least one further region using fill data of said received contributing objects, said local compositing sequence being generated in a second memory accessible by a program thread assigned to process said at least one further region.

According to still another aspect of the present disclosure, there is provided an apparatus for generating an intermediate representation of a document, the apparatus comprising:

means for receiving a plurality of objects of the document with associated fill data and a drawing operation;

means for generating a global compositing sequence for at least one of said objects using the fill data and the compositing operation associated with said at least one object, the global compositing sequence being generated independently of a relative arrangement of said objects within the document, the generated global compositing sequence being stored in a first memory concurrently accessible by a plurality of program threads;

means for generating a further compositing sequence for regions of the document to generate the intermediate representation, said regions being determined based on relative arrangement of the objects within the document, creating a reference to a global compositing sequence stored in the first memory for at least one of said regions, the reference being created using the fill data of at least one contributing object of said at least one region; and means for generating a local compositing sequence for at least one further region of the document upon receiving contributing objects for said at least one further region using fill data of said received contributing objects, said local compositing sequence being generated in a second memory accessible by a program thread assigned to process said at least one further region.

According to still another aspect of the present disclosure, there is provided a system for generating an intermediate representation of a document, the system comprising:

a memory for storing data and a computer program;

a processor coupled to the memory for executing the computer program, the computer program comprising instructions for:

receiving a plurality of objects of the document with associated fill data and a drawing operation;

generating a global compositing sequence for at least one of said objects using the fill data and the compositing operation associated with said at least one object, the global compositing sequence being generated independently of a relative arrangement of said objects within the document, the generated global compositing sequence being stored in a first memory concurrently accessible by a plurality of program threads;

generating a further compositing sequence for regions of the document to generate the intermediate representation, said regions being determined based on relative arrangement of the objects within the document, creating a reference to a global compositing sequence stored in the first memory for at least one of said regions, the reference being created using the fill data of at least one contributing object of said at least one region; and generating a local compositing sequence for at least one further region of the document upon receiving contributing objects for said at least one further region using fill data of said received contributing objects, said local compositing sequence being generated in a second memory accessible by a program thread assigned to process said at least one further region.

According to still another aspect of the present disclosure, there is provided a non-transitory computer readable memory having a program stored thereon for generating an intermediate representation of a document, the program comprising:

code for receiving a plurality of objects of the document with associated fill data and a drawing operation;

code for generating a global compositing sequence for at least one of said objects using the fill data and the compositing operation associated with said at least one object, the global compositing sequence being generated independently of a relative arrangement of said objects within the document, the generated global compositing sequence being stored in a first memory concurrently accessible by a plurality of program threads;

code for generating a further compositing sequence for regions of the document to generate the intermediate representation, said regions being determined based on relative arrangement of the objects within the document, creating a reference to a global compositing sequence stored in the first memory for at least one of said regions, the reference being created using the fill data of at least one contributing object of said at least one region; and code for generating a local compositing sequence for at least one further region of the document upon receiving contributing objects for said at least one further region using fill data of said received contributing objects, said local compositing sequence being generated in a second memory accessible by a program thread assigned to process said at least one further region.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
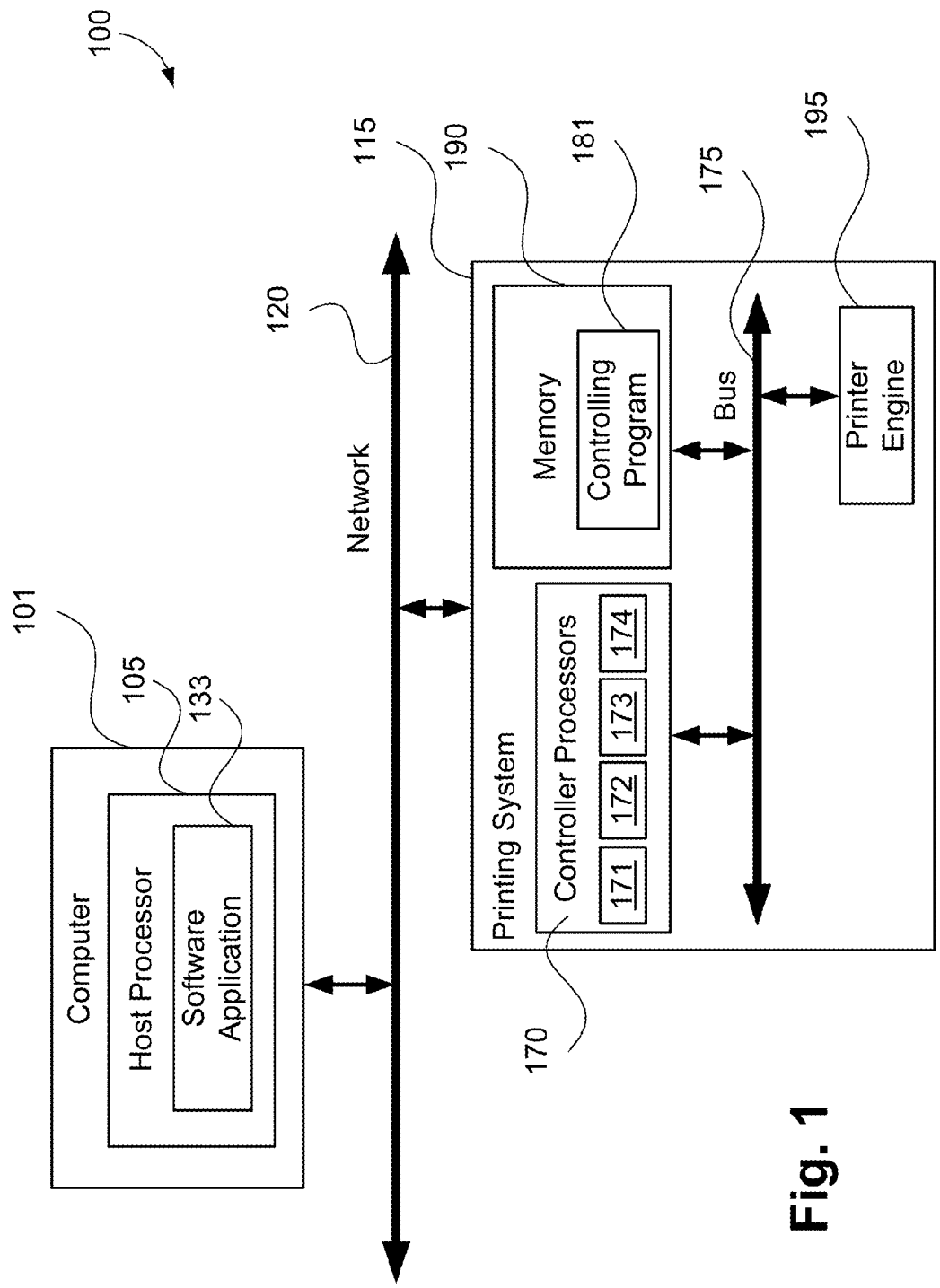
FIG. 1 is a schematic block diagram of a multi-processor printing system for rendering a document.

Where reference is made in any one or more of the accompanying drawings to steps and/or features, which have the same reference numerals, those steps and/or features have for the purposes of this description the same function(s) or operation(s), unless the contrary intention appears.

Conventionally, fill compositing sequences are created and updated only when generating regions of a region-based representation in the form of a fillmap for a document. The generation of regions is performed by fillmap generation (FG) tasks, which form the bulk of parallel processing work. Therefore, in conventional methods, performance penalties often occur upon creating and updating fill compositing sequences, due to required synchronisation of write access to a shared set of fill compositing sequences.

In methods described below, display list (DL) tasks produce object based representations in the form of display lists prior to generation of regions by fillmap generation (FG) tasks. The display list (DL) tasks running sequentially for a given page, update a global compositing set, while fillmap generation (FG) tasks, running in parallel, update corresponding fillmap compositing sets. Therefore, no locking is required to create or update a fill compositing sequence in any fill compositing set, in the described methods.

During generation of the object-based representations in the form of the display lists, a precise set of fill compositing sequences needed cannot be known, as regions are yet to be determined. Therefore, a global compositing set maintained by display list (DL) tasks contain fill compositing sequences that are estimated to be required. The estimation is based on the observation that the fill compositing sequences of the majority of regions are likely to be formed by a single object only. As such, many fill compositing sequences can be created prior to determining regions. Further, the fill compositing sequences are stored in a global compositing set that is shared by multiple parallel fillmap generation (FG) tasks in a "read only" fashion, meaning that no locking is required when accessing the global compositing set.

The described methods are used in a multi-threaded rendering system. The described methods use a global compositing set that requires only "read-only" access by parallel threads, with a dedicated fillmap compositing set for each individual thread. The described methods eliminate frequent write access to a shared set of fill compositing sequences. The fact that the single global compositing set will likely contain the most commonly used fill compositing sequences means that duplication of fill compositing sequences in the dedicated fillmap compositing sets is minimised.

The introduction of a global compositing set and changes to fillmap structure require a change in fillmap rendering algorithm, as described below.

The described methods enable efficient storage of fill compositing sequences and updating fill compositing sequences. The described methods may be implemented in a multi-threaded raster image processor (RIP), and more specifically a builder module that is used for generating region-based representations, in the form of fillmaps, of each page.

FIG. 1 shows a schematic block diagram of a pixel rendering system 100 for rendering an image comprising graphic objects. The pixel rendering system 100 comprises a computer module 101 connected to a printing system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices, such as a USB, serial, parallel or FireWire cable.

The computer module 101 comprises at least one host processor 105 for executing a software application 133, such as a word processor or graphical software application.

The printing system 115 comprises plurality of controller processors 170. As shown in FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of the various kinds of processors described above.

The printing system 115 also has a printer engine 195 coupled to the controller processors 170, via an interconnected bus 175. The controlling program 181 accepts a printable document 201 (see FIG. 2) produced by a software application 133 and produces pixel data values for printing. As described below, the controlling program 181 is configured for receiving a plurality of objects of the document 201 with associated fill data and a drawing operation for use in producing the pixel data values for printing. The pixel data values may then be stored in memory 190 and reproduced as pixels by the printer engine 195, for example. The controlling program 181 may be executed by the controller processors 170 in one or more threads of execution. A program thread consists of a number of instructions or steps that are executed in sequence by one of the processors 171-174. The controlling program 140 will be further described in detail below with reference to FIG. 2.

Figure 3A:
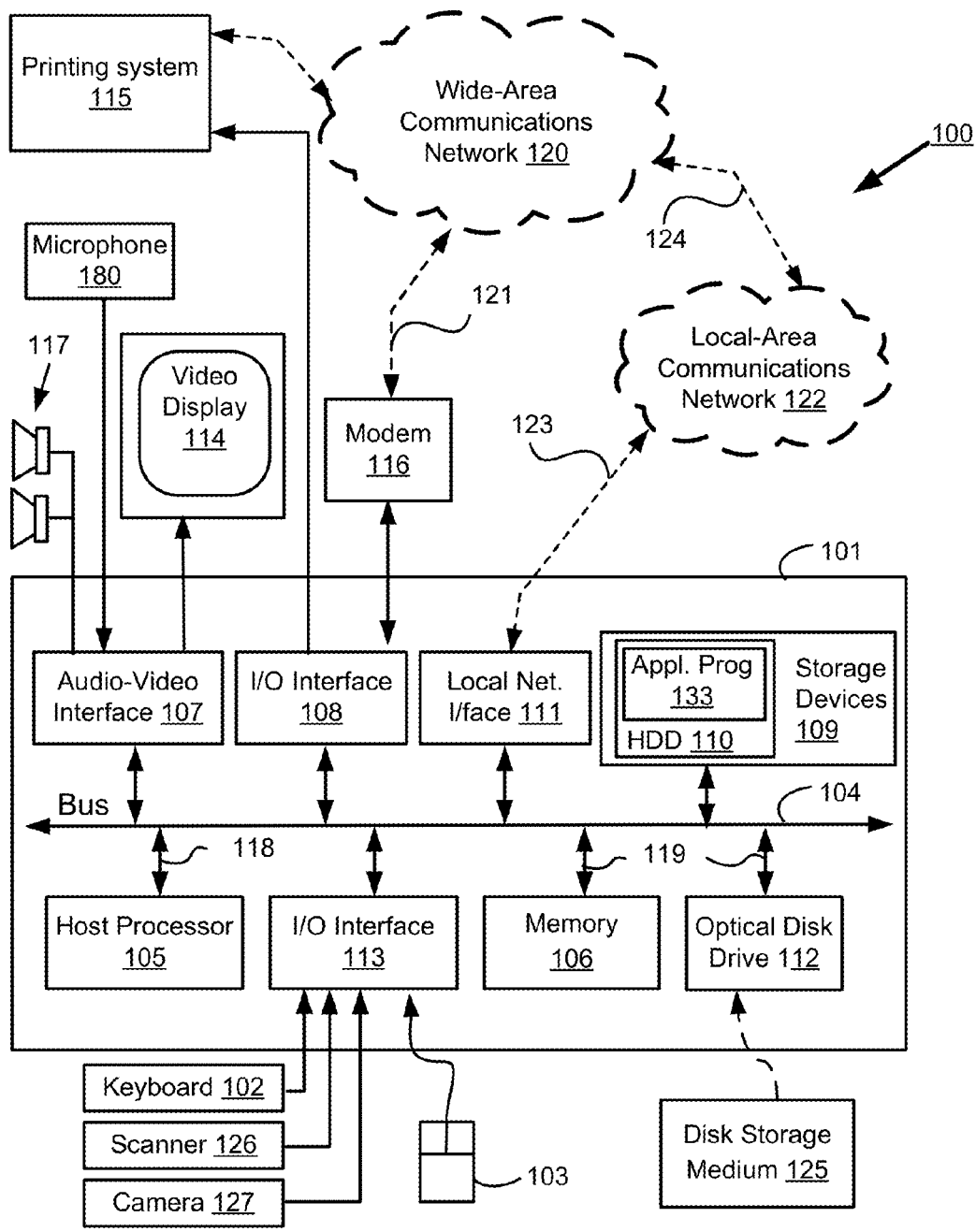
FIGS. 3A and 3B collectively form a schematic block diagram of a general-purpose computer system of the system of FIG. 1 in more detail.

As seen in more detail in FIG. 3A, the pixel rendering system 100 includes: the computer module 101; input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

The described methods may be implemented using the system 100 wherein one or more steps of the processes of FIGS. 2 and 4 to 10, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2 and 4 to 10 to be described, may be implemented as one or more of the code modules forming the controlling program 181 executable within the printing system 115. Again, one or more of the steps of the described methods may be effected by instructions of the controlling program 181, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
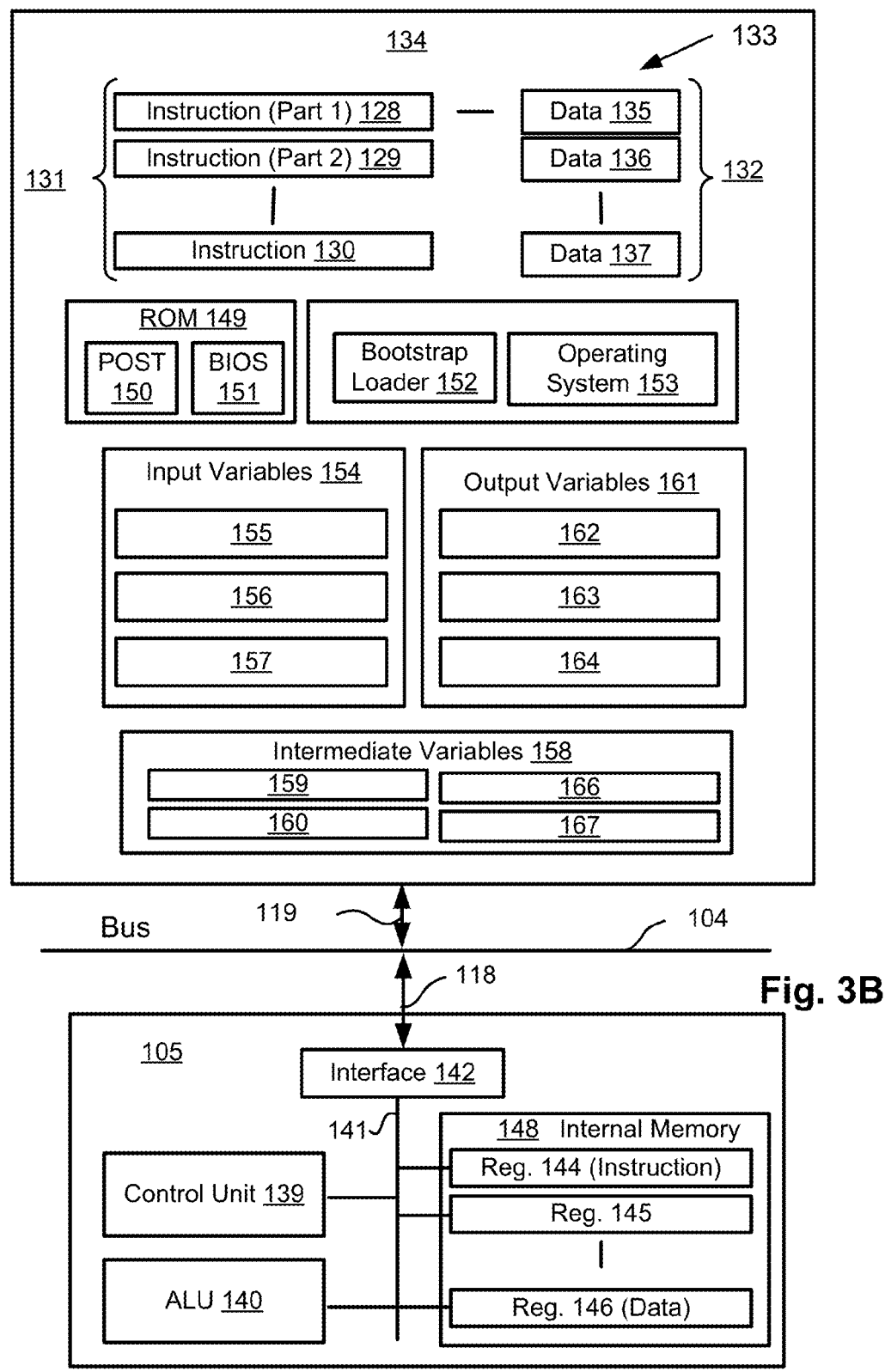

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIGS. 1 and 3A need to be used properly, so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 10 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 10, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
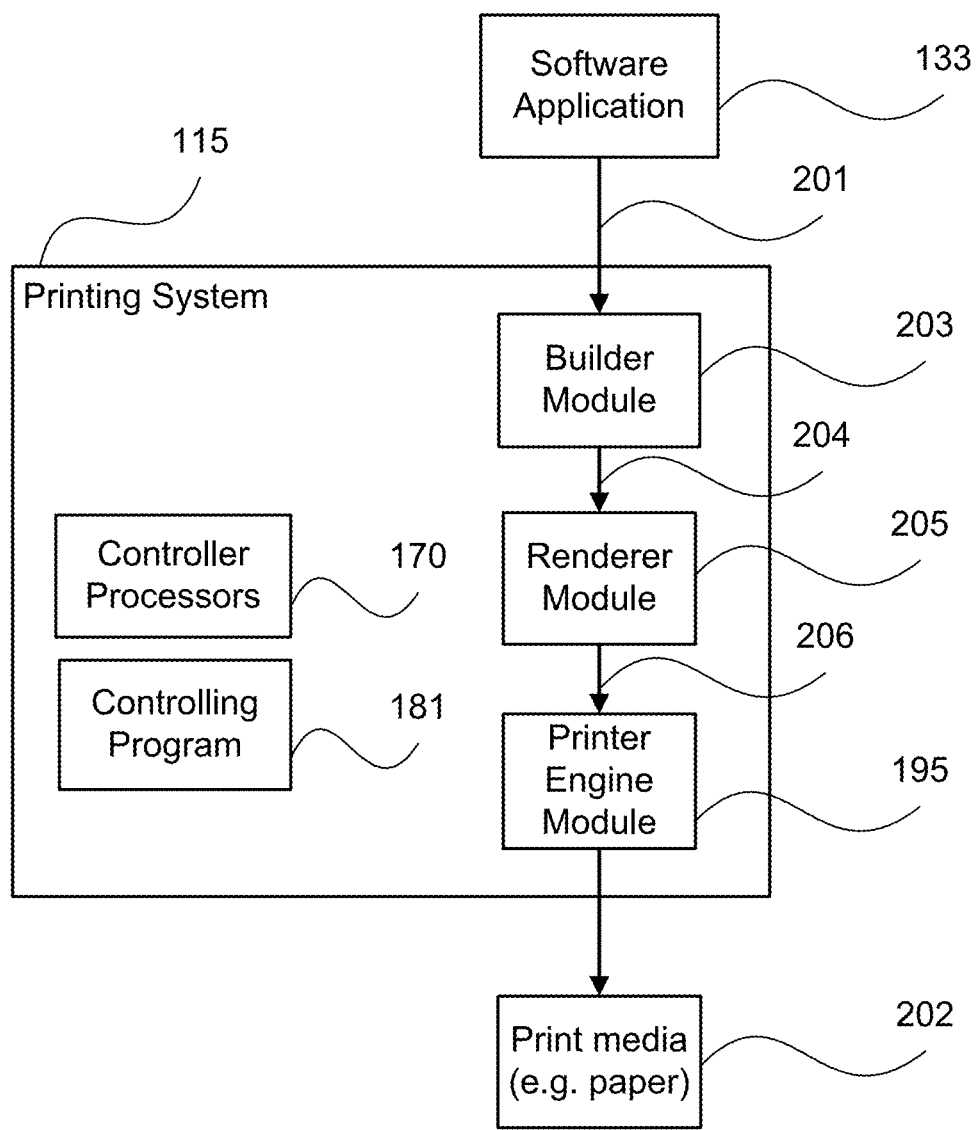
FIG. 2 is a software architecture for the printing system of FIG. 1.

FIG. 2 shows a software architecture for printing a printable document 201 using the printing system 115. Each of the modules 203 and 205 described below may be formed by one or more of the code modules of the controlling program 181.

The software application 133, for example, executing on the computer module 101, provides the printable document 201 to the printing system 115 for printing to print media 202, such as a paper sheet. The printable document 201 is typically provided in the form of a description of the printable document 201, the description being specified using a Page Description Language (PDL), such as Adobe® PDF or Hewlett-Packard® PCL. The PDL provides descriptions of one or more graphic objects on each page to be rendered onto the print media 202 in a "painting" (or z) order, as opposed to a raster image (i.e. a bitmap of pixel values) of each page to be printed.

A builder module 203 receives the printable document 201 and is configured for generating intermediate region-based representations known as final fillmaps 204 of the pages of the printable document 201 to be printed. The printing system 115 then uses a renderer module 205 to render each final fillmap 204 to pixel data values 206. The pixel data values 206 are printed to the print media 202, such as paper, using a printer engine module 195. The printer engine module 195 may, for example, be an electro-photographic engine.

The builder module 203 and renderer module 205 may be implemented as one or more code modules of the controlling program 181 which is executed by the controller processors 170 within the printing system 115. Commonly, the builder module 203 and renderer module 205 are collectively known as a raster image processor (RIP). The builder module 203 will be described in more detail later with reference to FIG. 4. The renderer module 205 will be described in more detail later with reference to FIG. 9 and FIG. 10.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Returning to FIG. 1, in the pixel rendering system 100, the software application 133 creates printable documents for printing, such as printable document 201. The printable document 201 often contains graphic objects such as text, lines, fill regions, and image data. The software application 133 sends a high-level description of the printable document (e.g., a PDL file) via the network 120 to the controlling program 181 that is executed by the controller processors 170 of the printing system 115. The printable document 201 contains all information required by the printing system 115 to render and print each page of the document.

In alternative arrangements, the printing system 115, the controller processors 170 and controlling program 181, may be resident in separate servers connected to the network 120. In still another alternative arrangement, the printing system 115, the controller processors 170 and controlling program 181 may be resident in a distributed network of servers. In such systems, the raster image representation produced by the controlling program 181 is sent to the printer engine module 195 via a network 120 rather than the bus 175.

The described methods may also be implemented as part of other graphics rendering systems in which an intermediate representation is rendered (e.g. for displaying PDF documents on an LCD display). As such, the described methods are not limited to printing systems.

Figure 4:
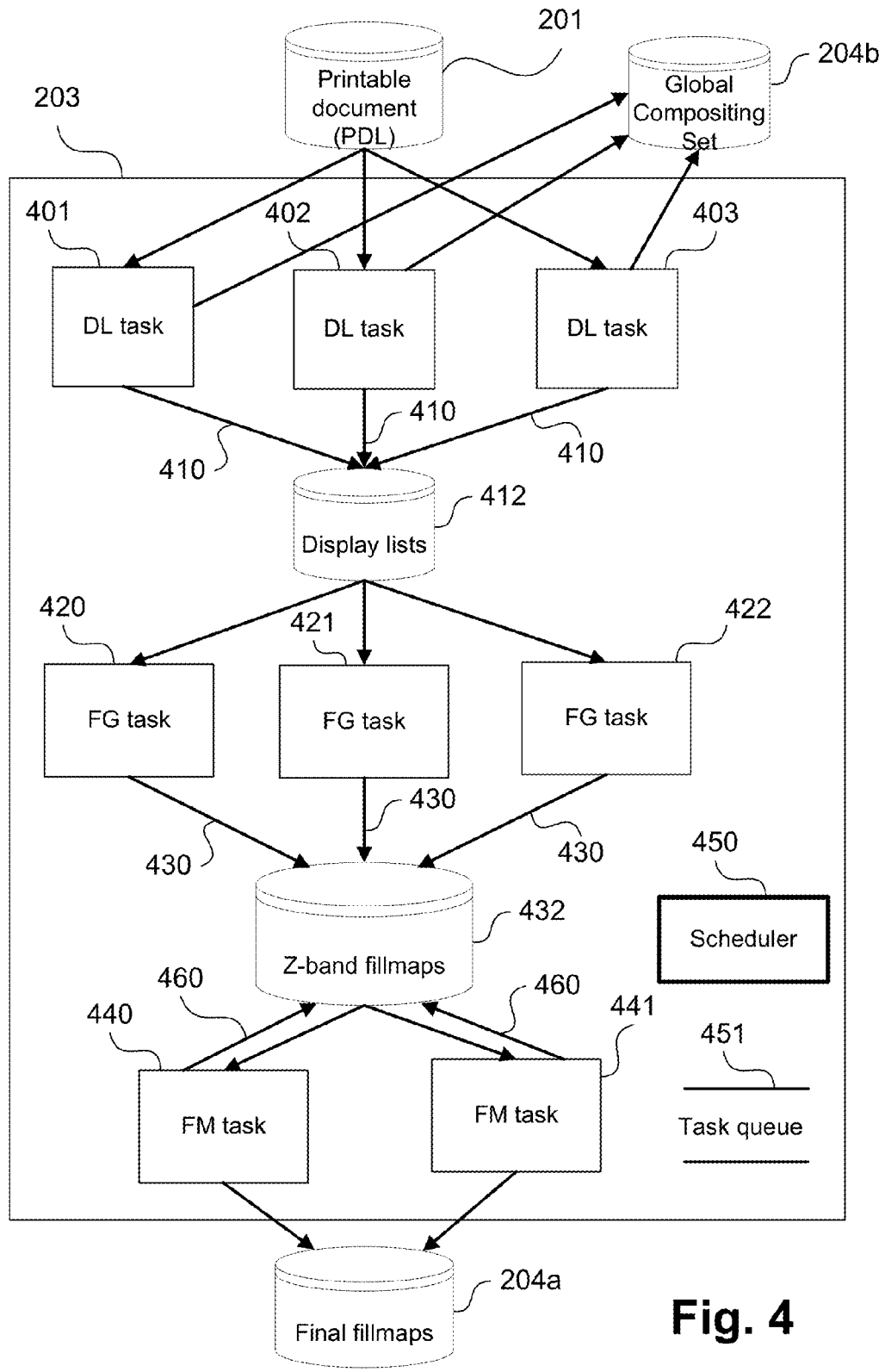
FIG. 4 is a block diagram of the tasks and components of the builder module.

The builder module 203 will now be described in more detail with reference to FIG. 4. The builder module 203 is configured for generating (or "building") page fillmaps 204a and a global compositing set 204b as seen in FIG. 4. Together the page fillmaps 204a and the global compositing set 204b form an intermediate region-based representation, known as the final fillmap 204, of each page of the printable document 201 being printed. As described in detail below, the intermediate region-based representation is generated based on at least one compositing sequence determined for regions formed using an object-based representation of each page in the form of a z-band display list 410 for the document 201. The regions are formed based on a relative arrangement of objects within the document 201 as represented by the z-band display list 410.

As described earlier with reference to FIG. 2, the builder module 203 is configured for receiving a printable document 201 in the form of a page description language (PDL) file. The printable document 201 may comprise a plurality of graphic objects with associated fill data and a compositing operation. As seen in FIG. 4, one or more display list generation tasks 401-403, hereafter referred to as DL tasks, interpret the printable document 201 represented by PDL input in a manner specific to the type of PDL. For example, a PDL file in the form of Adobe® PDF will require different interpreting steps to those of a PDL file in the form of Hewlett-Packard® PCL. However, no matter the PDL, the DL tasks 401-403 produce a sequence of graphic objects in an order known as z-order. The DL tasks (e.g., 401, 402, 403) may be implemented as one or more software code modules forming the controlling program 181 resident in the memory 190 of the printing system 115 and being controlled in execution by the controller processors 170.

Each DL task 401-403 interprets one or more pages of the printable document 201 in z-order to form an object-based representation in the form of a z-band display list 410 for the document 201. The display lists 410 may be stored in memory 190, as depicted in FIG. 4 as display lists 412. In addition to generating (building) the object-based representations in the form of the display lists 410, DL tasks are also used for generating (building) a global compositing set 204b for a given page. Global compositing set 204b contains the combinations of fill data and compositing operations (or operators) determined as likely to be used in the final fillmap 204. Details of how the global compositing set 204b is determined will be described later with reference to FIG. 5.

Each display list 410 contains a sequence of graphic objects with consecutive z-order sorted by the first scan lines on which the graphic objects appear. An example of splitting the graphic objects of a page of a printable document 201 into one or more z-bands will be described later with reference to FIGS. 6A and 6B.

For each z-band display list 410, a corresponding fillmap generation task 420-422, hereafter referred to as an FG task, is created. The FG tasks (e.g., 420, 421 and 422) may be implemented as one or more software code modules forming the controlling program 181 resident in the memory 190 of the printing system 115 and being controlled in execution by the controller processors 170. In the example shown in FIG. 4, the DL tasks 401-403 have split the graphic objects of a page of the printable document 201 into three object-based representations in the form of z-band display lists 410. Therefore, three FG tasks 420-422 are created.

Each FG task 420-422 receives a display list 410 and converts that display list to a region-based representation of a page of the document 201 in the form of z-band fillmap 430. Each DL task updates the content of global compositing set 204b, based on the data of the display list that the DL task generates. The fillmaps 430 are temporarily stored in the memory 190 as depicted at 432 while the global compositing set 204b may also be stored to the memory 190. For example, FG task 420 receives the z-band display list produced by DL task 401 and produces a z-band fillmap representing the same sequence of graphic objects. The fillmap generation process executed by an FG task 420-422 will be described in more detail later with reference to FIG. 5. In some implementations, an FG task may be further split into several FG tasks that can be executed in parallel. For example, the page can be split into several horizontal y-bands or strips. For a given z-band display list, the z-band fillmap data for each strip can be generated in parallel using several FG tasks, one per y-band. This allows z-band fillmaps to be produced more quickly, and increases the parallelism in the builder module 203 which will allow controller processors with a large number of processors to be fully utilised.

The z-band fillmaps 430 generated by FG tasks 420-422 represent intermediate region-based representations of z-bands of a page of the printable document 201. In one arrangement, multiple threads are used to generate the region-based representations, each thread being used to form at least one z-band of the region-based representation.

In order to produce the page fillmap 204a that together with earlier generated global compositing set 204b represent a final fillmap 204 of an entire page of the printable document 201, one or more fillmap merge tasks 440 and 441, hereafter referred to as FM tasks, are required. Each FM task 440 and 441 receives two or more z-band fillmaps 430 and merges the z-band fillmaps 430 into a single fillmap, which is another z-band fillmap 460. The merged z-band fillmap 460 is then stored back into memory 190 as represented at 432 in anticipation of additional fillmap merging. If there are no more z-band fillmaps left to merge, a final merge produces page fillmap 204a of a page of the printable document 201, which as depicted in FIG. 4, may also be stored to the memory 190.

For example, FM task 440 merges the z-band fillmaps 430 produced by FG tasks 420 and 421, to produce another z-band fillmap 460. FM task 441 then merges the z-band fillmap 460 produced by FM task 440 with the z-band fillmap produced by FG task 422. As there are only three z-band display lists 410 produced by DL tasks 401-403, in this example FM task 441 produces the page fillmap 204a for a page of the printable document 201. The fillmap merge process executed by FM tasks 440-441 will be described in more detail later with reference to FIG. 7.

As described above with reference to FIG. 2, the controlling program 181, and therefore the builder module 203 are executed by a multi-core controller processor 170. The tasks 401-403, 420-422 and 440-441 of the builder module 203 are therefore executed in parallel by the processor cores 171-174 of the multi-core controller processor 170. While many of the tasks are able to execute in parallel, there are some dependencies between the tasks that need to be satisfied. For example, because a page of the printable document 201 is interpreted in z-order, DL tasks 401-403 are not able to execute in parallel, so their execution is sequential. However, DL tasks for different pages can be executed in parallel using different threads. FG tasks are able to execute in parallel with all other tasks, but require a display list to have been produced by a DL task. Similarly, FM tasks are able to execute in parallel with all other tasks, but require two or more z-band fillmaps to have been already produced by FG tasks or other FM tasks, for a given page of the printable document 201.

A method of scheduling tasks of the builder module 203 will now be described with reference to the tasks of the builder module 203 described with reference to FIG. 4. To perform the scheduling, the builder module 203 includes a scheduler 450 and a task queue 451. The scheduler 450 performs the operations of creating tasks, adding tasks to the task queue 451, and deciding which task to run on an idle thread. In one arrangement, the scheduler 450 operates in its own thread executing on one of the controller processors 170. The task queue 451 is a queue of tasks whose dependencies have been satisfied and are therefore able to be executed. The tasks in the task queue 451 are preferably sorted first by page number (i.e., smaller page numbers first), then by z-order (i.e., smaller z-orders first). The task queue 451 uses a portion of memory 190.

The described methods address the problem of efficient storage of compositing sequences within a builder module 203 of a printing system 115, for example, when components of the builder module 203 execute in multi-threaded environment.

A fillmap representation of a graphical image such as a page will now be described in more detail. A fillmap is a region-based representation of a page. The fillmap maps a region of pixels within the page to a fill compositing sequence which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges:
(i) are monotonically increasing in the y direction of the page;
(ii) do not intersect with each other;
(iii) are aligned with pixel boundaries, meaning that each pixel-aligned fillmap edge consists of a sequence of segments, each of which follows a boundary between two contiguous pixels;
(iv) contain a reference to the fill compositing sequence required to be composited to render to pixels the fillmap region to which the pixel-aligned fillmap edge belongs; and
(v) activate pixels within a single fillmap region.

The reference to the fill compositing sequence assigned to the fillmap region is used to render the region-based representation in the form of the fillmap region. On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill compositing sequence active within each fillmap region of pixels is stored in a set of fill compositing sequences. A fill compositing sequence is a sequence of z-ordered levels. Each level contains attributes such as a fill (which contribute colour to the pixels), opacity of the level, and a compositing operator which determines how to mix colour data of this level with other overlapping levels. The fill compositing sequence is ordered according to the priority, or z-order, of the contributing levels. A set of fill compositing sequences contains the fill compositing sequences required to render the page to pixels. Preferably, a set of fill compositing sequences does not contain duplicate instances of identical fill compositing sequences. Hence, multiple fillmap regions within a fillmap which map to the same fill compositing sequence preferably map to the same instance of the fill compositing sequence within the set of fill compositing sequences.

In one arrangement, references to fill compositing sequences are indices into a table of fill compositing sequences. There are two types of tables of fill compositing sequences. One type of table is called the global compositing set 204b. Only one compositing set 204b is created per page, at the start of the PDL interpretation. For a given page, the global compositing set 204b is updated by a DL task. At any given time, there is only one DL task for a given page that updates the global compositing set of the page, as the DL tasks for an individual page execute in sequence. After finishing DL tasks, the global compositing set 204b is marked read-only. Any subsequent tasks (or tasks executed in parallel), such as fillmap generation or fillmap rendering tasks, can share the access to the global compositing set 204b. However, these subsequent task cannot modify the global compositing set 204b.

Another type of table is called a fillmap compositing set. There may be several instances of fillmap compositing sets per page. The fillmap compositing sets are created by FG tasks and updated by FG and FM tasks. For a given fillmap compositing set at any given time, there is only one FG or FM task that updates that fillmap compositing set.

In one arrangement, a DL task generates (builds) a first set of data entries characterising each fill that appears in a display list. Each data entry in the first set of data entries is called a fill record and comprises a fill, an opacity and a compositing operation that defines how the fill combines with a backdrop in accordance with the corresponding opacity. Examples of the most common types of fills are flat (uniform) colours, colour blends (also known as gradients), and bitmaps. Other types of fills are known and may be used in accordance with the described methods. In one arrangement, only unique fill records are stored to minimise memory usage. A hash table may be used to assist in identifying duplicate fill records using any suitable method.

At the same time as creating the set of fill records, a DL task generates (or builds) a global compositing set for a page. The global compositing set is a set of fill compositing sequences consisting of a single fill record. Each fill compositing sequence of the global compositing set may be referred to as a "global" compositing sequence. Each fill compositing sequence of the global compositing set is generated based on a predetermined rule, using fill data and a compositing operation associated with a plurality of objects of the page of the document. As such, the DL task is used for generating a global compositing sequence for at least one of the objects of the page using the fill data and the compositing operation associated with the object, the global compositing sequence being generated independently of a relative arrangement of the objects within the page of the document. Both the set of fill records and the global compositing set are updated at the same time with the addition of a new entry whenever a new, unique fill record is encountered.

In one arrangement, the predetermined rule is that if the opacity stored in the fill record is 100%, the corresponding fill compositing sequence consists of the fill record (for example a pixel value for a flat fill, or memory reference to a bitmap for a bitmap fill). If the object is partially transparent, the fill compositing sequence consists of the fill record composited with the image background. The fill compositing sequences (i.e., the global compositing sequences) of the global compositing set are pre-generated and stored in the global compositing set 204b within memory 190 because the compositing sequences generated for the global compositing set have a high likelihood of being required for a region of the fillmap to be generated from the display list. In addition, the fill compositing sequences of the global compositing set may be generated without first determining regions. The fill compositing sequences of the global compositing set are also likely to be referenced by multiple band fillmaps. Storing the fill compositing sequences once as part of the global compositing set configured in the memory 190 instead of multiple times in each fillmap compositing set in which the compositing sequences occur minimises duplication.

In one arrangement, fill records and corresponding single-level fill compositing sequences may be accessed in the sets by indices. The indices of fill records and the corresponding single level fill compositing sequences are identical.

In an alternative arrangement, other rules may be used to pre-generate fill compositing sequences in the global compositing set 204b. For example, if two or more objects overlap each other, a resulting multi-level fill compositing sequence for an expected region consisting of the overlapping objects and referring to two or more corresponding fill records may be pre-generated during display list generation, stored in the global compositing set 204b and assigned an index from a set of indices reserved for multi-level fill compositing sequences only.

Subsequently within an FG task, a fill compositing sequence may be assigned to at least one region in a fillmap. The builder module 203 is configured for determining whether the fill compositing sequence assigned to the region satisfies the predetermined rule (or "criteria") that were used in the DL task to determine whether a fill compositing sequence should be added to the global compositing set. Where the fill compositing sequence assigned to the region satisfies the predetermined rule (criteria), the FG tasks, under execution of the controller processors 170, are configured for creating a reference to an existing fill compositing sequence (i.e., a "global" compositing sequence) in the global compositing set stored in the memory 190, the created reference pointing to the existing fill compositing sequence in the global compositing set. The reference is created using the fill data of at least one object contributing to the region. In one arrangement, the predetermined rule is determined based on number of objects contributing to the region. In accordance with such a predetermined rule, the global compositing sequence may be formed using a fill from no more than one object contributing the region. In another arrangement, the predetermined rule is determined by predicting at least one arrangement of fills in the region based on knowledge about overlapping ones of the objects contributing to the region.

If the fill compositing sequence assigned to the region does not satisfy the predetermined rule (criteria) that was used in the DL task to determine whether a fill compositing sequence should be added to the global compositing set, the FG tasks are configured for generating a reference to an existing fill compositing sequence (i.e., a local fill compositing sequence) in a fillmap compositing set configured in memory 190. As described, the referenced existing fill compositing sequence is generated for at least one region of the document 201 upon receiving objects contributing to the region using fill data and compositing operations associated with the received contributing objects.

The reference to a fill compositing sequence is then flagged as referencing the global compositing set or a fillmap compositing set as described below.

The fillmap compositing set may be referred to as a local compositing sequence store. The builder module 203 may be configured for storing the fill compositing sequence in such a local compositing sequence store which is accessible by a thread of the controlling program 181 assigned to process a z-band in a fillmap corresponding to the region.

In one arrangement, in the case where there is only one level contributing to a fill compositing sequence and referencing one fill record, the FG task uses that fill record reference to create a reference to the global compositing set 204b. In such an arrangement where the FG task uses the fill record reference to create a reference to the global compositing set 204b, the fill record index value is used as the fill compositing sequence index, because the fill record and the fill compositing sequence have the same index value. Accordingly, the fill compositing sequence in the global compositing set 204b (or global compositing sequence store) may be accessible by a unique index derived from at least one fill contributing to the fill compositing sequence.

In an alternative arrangement, in the case where two or more, previously known overlapping objects contribute to a fill compositing sequence, the FG task can search the set of indices reserved for multi-level fill compositing sequences only, and if found, the FG task uses the index as a reference to the global compositing set 204b configured within memory 190. The FG task will be described in more detail with reference to FIG. 8.

The global compositing set 204b may be referred to as a global compositing sequence store. As described below, the builder module 203 may be configured for storing a global compositing sequence in such a global compositing sequence store which may be concurrently accessible by a plurality of the program threads of the controlling program 181 used to perform a read operation. The global compositing sequence store may be configured in a first portion of the memory 190.

Figure 5A:
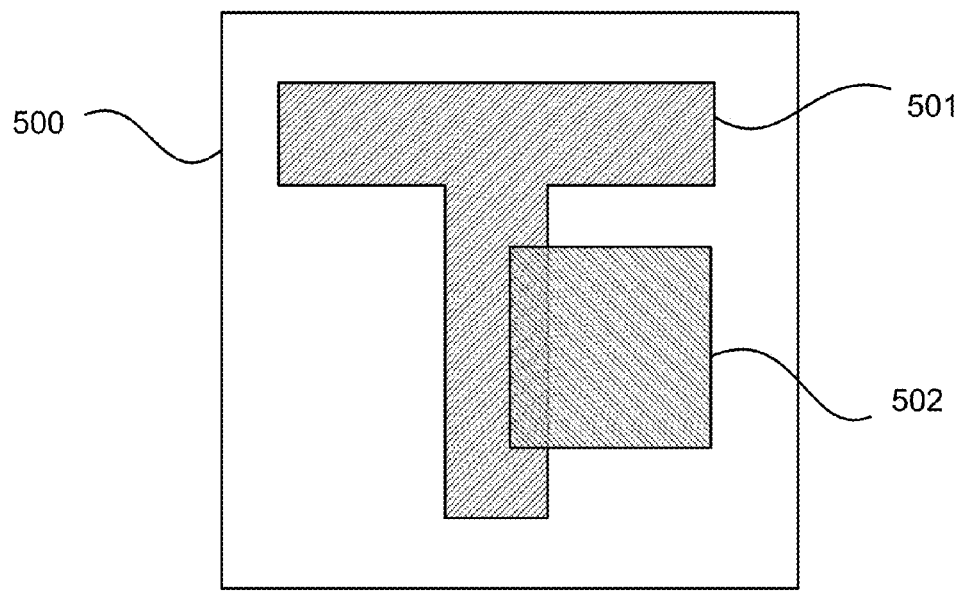
FIG. 5A shows an example of a page with graphic objects.

The generation of a region-based representation, in the form of a fillmap, of a page will now be described with reference to FIGS. 5A to 5D. FIG. 5A shows a page representation 500. The page 500 has a white background and contains two graphic objects 501 and 502. The first graphic object 501 is an opaque T-shaped object with a right-leaning hatched fill. The second graphic object 502 is a transparent square with a left-leaning hatched fill. Examples of other fills are blends representing a linearly varying colour, bitmap images or tiled (i.e., repeated) images. The second graphic object 502 partially overlaps the first graphic object 501.

Figure 5B:
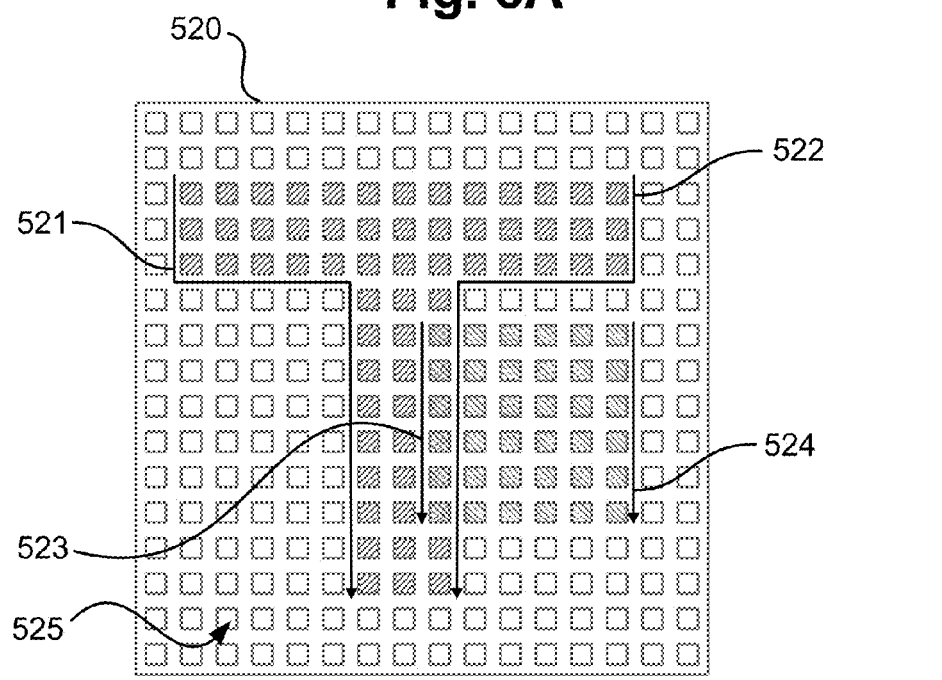
FIG. 5B shows pixel-aligned object edges, and associated fills, of the page of FIG. 5A.
Figure 5B:
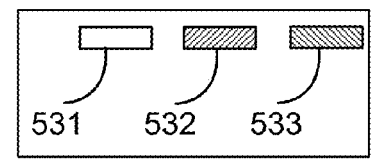

FIG. 5B shows the decomposition of the graphic objects 501 and 502 of the page 500 into pixel-aligned graphic object edges, levels and fills according to a pixel grid 520. A graphic object is decomposed into two or more pixel-aligned object edges, a single level, and one or more fills. Pixel-aligned graphic object edges define activation or deactivation of a level during rasterization. Pixel-aligned graphic object edges therefore refer to the level of the object from which the pixel-aligned graphic object edges are derived. The first graphic object 501 is decomposed into two pixel-aligned graphic object edges 521 and 522, and a level 532 that consists of a right-leaning hatched fill. Pixel-aligned graphic object edges 521 and 522 refer to the level 532 of the first graphic object 501. The second graphic object 502 is decomposed into two pixel-aligned graphic object edges 523 and 524, and a level 533 that consists of a transparent left-leaning hatched fill. Pixel-aligned graphic object edges 523 and 524 refer to the level 533 of the second graphic object 502. The background 525 has a level 531 that consists of white fill.

Figure 5C:
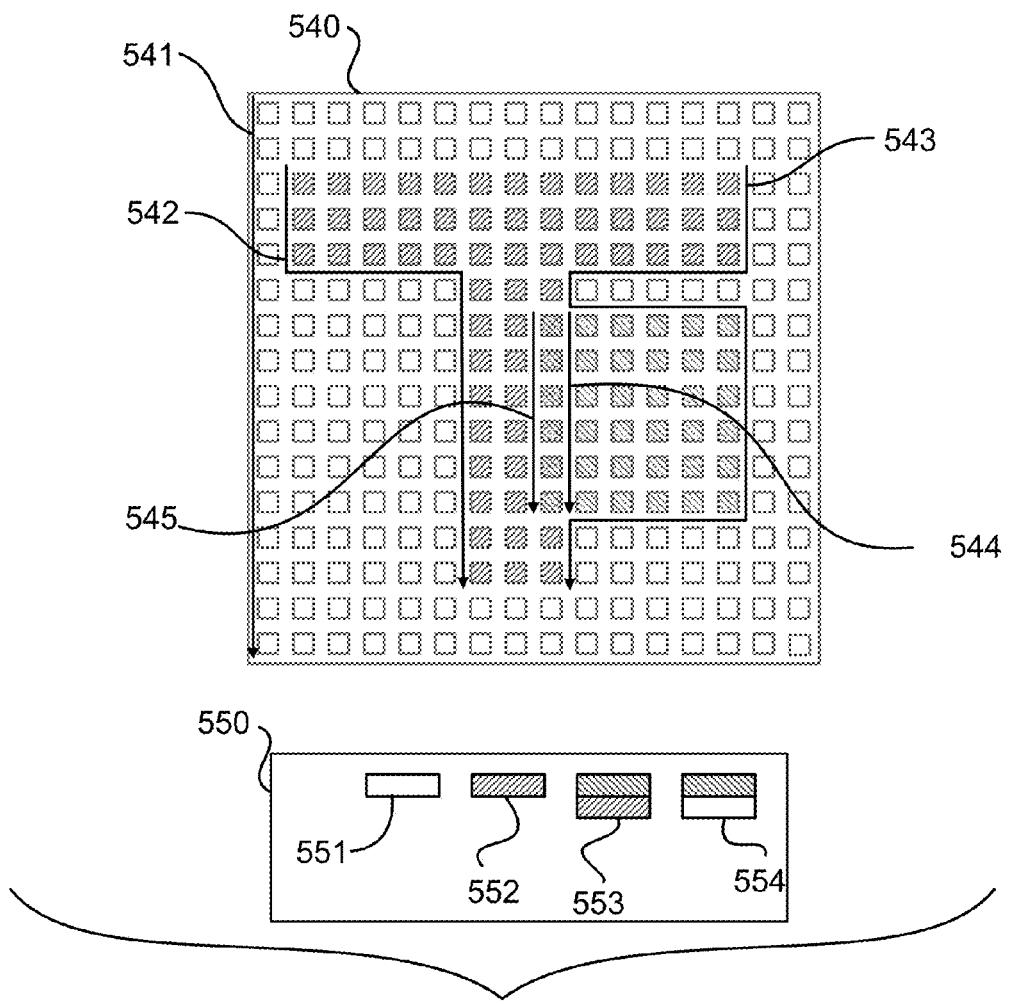
FIG. 5C shows a fillmap representation of the page of FIG. 5A.

FIG. 5C shows a fillmap representation 540 and a table of fill compositing sequences 550, of the page 500 represented in FIG. 5A. The fillmap representation 540 is composed of five pixel-aligned fillmap edges, hereafter known as fillmap edges or simply as edges, and four fill compositing sequences. Each edge references a fill compositing sequence which is used to determine the colour of each of the pixels activated by that edge. On any given scan line on which an edge is active, the edge activates those pixels which are immediately to the right of the edge, until a next edge or a page boundary is encountered. The first edge 541 traces a left hand boundary of the page 500, and references a fill compositing sequence 551 which contains a single opaque level which is to be filled using the background fill. The second edge 542 traces the left hand boundary of the first graphic object 501, and references a fill compositing sequence 552 that contains a single level which is opaque and is to be filled using a right-leaning hatched fill. The third edge 543 references the same fill compositing sequence 551 as the first edge 541. The fourth edge 544 traces the left hand boundary of the region where the second object 502 overlaps the white background. The fourth edge 544 references a fill compositing sequence 554 which contains two levels. The top most level is transparent and is to be filled using a left-leaning hatched fill. The bottom most level is opaque and is to be filled using the background fill. The fifth edge 545 traces the left hand boundary of the region where the second graphic object 502 overlaps the first graphic object 501. The fifth edge 545 references a fill compositing sequence 553 which contains two levels. The top most level is transparent and is to be filled using a left-leaning hatched fill. The bottom most level is opaque and is to be filled using a right-leaning hatched fill.

Accompanying the fillmap representation 540 of the page 500 is a table of fill compositing sequences 550 which contains the fill compositing sequences 551, 552, 553 and 554 referenced by the edges contained in the fillmap representation 540 of the page 500.

Figure 5D:
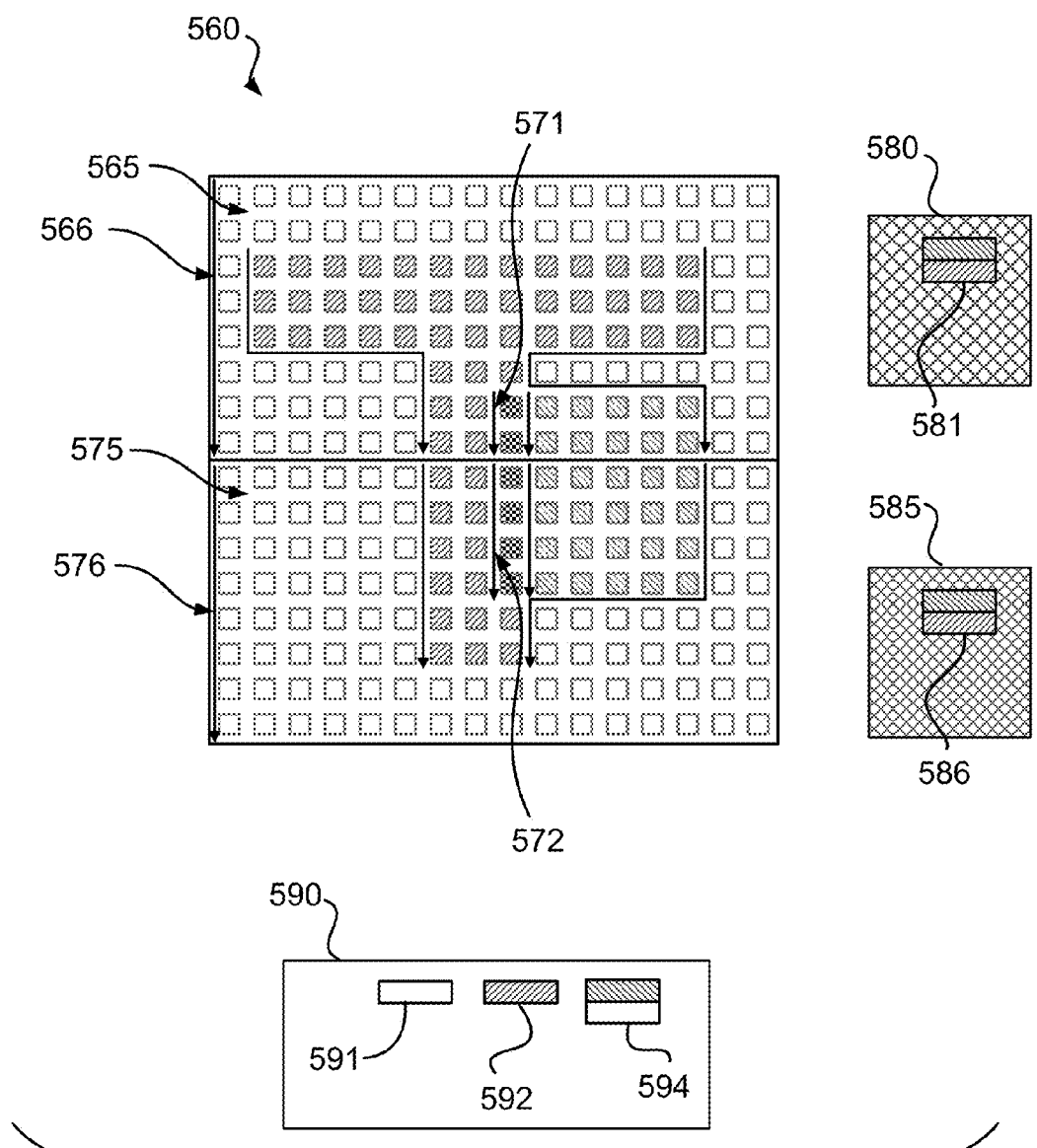
FIG. 5D shows a y-banded fillmap representation of the page of FIG. 5A.

FIG. 5D shows a y-banded fillmap representation 560 of the page 500 represented in FIG. 5A according to one arrangement. The y-banded fillmap representation 560 contains two bands 565 and 575. Each y-band (e.g., 565 and 575) has a height of eight pixels, which is half the height of the unbanded fillmap representation 540 shown in FIG. 5C. The y-banded fillmap representation 560 contains three sets of fill compositing sequences. The first set 580 contains fill compositing sequences referenced by edges in band 565, the second set 585 contains fill compositing sequences referenced by edges in band 575, and the third set 590 contains fill compositing sequences referenced by all bands of the y-banded fillmap representation 560. Fill compositing sequence sets referenced only by a single band such as sets 580 and 585 will be referred to below as "fillmap compositing sets", and sets referenced by multiple bands such as set 590 will be referred to below as "global compositing sets".

In order to generate the y-banded fillmap representation 560 of the page 500, the edges of the fillmap representation 540 have been split across y-band boundaries. For example, the edge 541 which traces the left hand boundary of the page in the fillmap representation 540 as seen in FIG. 5C has been divided into two edges 566 and 576 as seen in FIG. 5D. The first edge 566 activates pixels in y-band fillmap 565, while the second edge 576 activates pixels in y-band fillmap 575. Also, the set of fill compositing sequences 550 seen in FIG. 5C has been split into a global compositing set 590 and two fillmap compositing sets 580 and 585 in the y-banded fillmap representation 560.

Global compositing set 590 contains fill compositing sequences that are pre-generated by DL tasks, such as tasks 401, 402 and 403. In one arrangement, fill compositing sequences in the global compositing set contain one fill record or one fill record plus a fill record representing a background of the page 500. Fillmap compositing sets 580 and 585 contain fill compositing sequences that are not pre-generated by DL tasks. In one arrangement, the fill compositing sequences of the compositing sets 580 and 585 contain at least two levels, where the two levels exclude a background level. For the y-banded fillmap representation 560, each fillmap compositing set is created and updated by the FG task of the corresponding fillmap. For example, set 580 is created and updated by the FG task generating y-band fillmap 565 and set 585 is created and updated by the FG task generating y-band fillmap 575. Each fill compositing set (i.e. fillmap compositing sets 580 and 585 and global compositing set 590) does not contain duplicate instances of identical fill compositing sequences within itself. However, two fillmap compositing sets can contain the same fill compositing sequence. For example, the sequences 581 and 586 are the same fill compositing sequences (i.e., left hatched fill over right hatched fill in the example of FIG. 5D). The sequences 581 and 586 are the same fill compositing sequences since sequences 581 and 586 come from two y-bands, from the edges 571 and 572 respectively, the result of splitting edge 545 between two y-bands. Fill compositing sequences in the global compositing set 590 in the example of FIG. 5D are unique across all fillmaps collectively representing a page.

The fillmap y-banding method may be extended to any number of y-bands when the original fillmap, such as fillmap representation 540, is split into more than two y-bands. The two y-bands may be of the same height.

Other fillmap banding methods may also be used in the described arrangements. For example, in another arrangement (x-banding scheme), a page is divided into vertical strips of predetermined width, where a fillmap representation is generated for each strip.

In yet another arrangement, y-banding and x-banding may be combined to produce a tiled page representation. Such a tiled page representation is called a tiled fillmap representation. In a tiled fillmap representation, each y-band is further subdivided into tiles where a fillmap is generated for each tile.

In all of the methods described above, a single global compositing set shares the fill compositing sequences with all bands or tiles. In y-banding and x-banding fillmap representations, each band has a corresponding fillmap compositing set that stores the fill compositing sequences local to the corresponding band.

In a tiled fillmap representation, each fillmap tile may have a corresponding fillmap compositing set. However, the fillmap tiles belonging to a single y-strip may share a single fillmap compositing set. In such an arrangement, there are only as many fillmap compositing sets as there are y-bands.

In one arrangement, in order to allow fillmap generation to execute in parallel on a multi-core processor, fillmap generation may be split into a number of independent FG tasks.

Therefore, there are as many fillmap compositing sets, as many FG tasks are executed in parallel on the multi-core processors 170. However, if FGs generating fillmaps are not executed in parallel, it is not necessary to have separate fillmap compositing sets for the fillmaps generated. For example, in a tiled fillmap representation, the fillmap tiles belonging to the same y-band may be shared if fillmap tiles belonging to the same y-band are generated by the same FG task or if FG tasks generating fillmap tiles belonging to the same y-band are executed serially. In one arrangement, a separate FG task is run for generating a fillmap for each y-band (strip) of the page. Therefore, if all of the FG tasks are run in parallel, each FG task creates its own fillmap compositing set.

In one arrangement, the fillmap representation, y-band fillmap representation and tiled fillmap representation stores edges in order of increasing start coordinate. More specifically, edges are sorted first by start y-value, and then edges with equal start y-value are sorted by start x-value. The start coordinate of an edge is the coordinate of the first pixel in the fillmap that the edge activates, when pixels are traversed in scan line order and from left to right. For example, the start coordinate of edge 542 shown in FIG. 5C is the coordinate of the first pixel in the fillmap that the edge activates (x=1, y=2), if the coordinate of the top-left pixel is (x=0, y=0). The edge 542 has a start x-value of one (1), and a start y-value of two (2). For example, with reference to the fillmap representation 540, edges are stored in the order edge 541, edge 542, edge 543, edge 545 and edge 544. The remaining coordinates of the first pixel on each scan line activated by an edge may be stored as a sequence of x-values with successive y-values beginning at the start y-value. The sequence of x-values may be further encoded using a method known as "delta encoding". In accordance with the delta-encoding method, each x-value is stored as the difference between the x-value and the previous x-value in the sequence of x-values of the corresponding edge. Therefore, the x-values of the sequence are commonly known as "deltas". In y-band and tiled fillmap representations, edges may be stored in a similar way with a separate list of edges retained in the memory 190 for each y-band or tile.

Figure 6A:
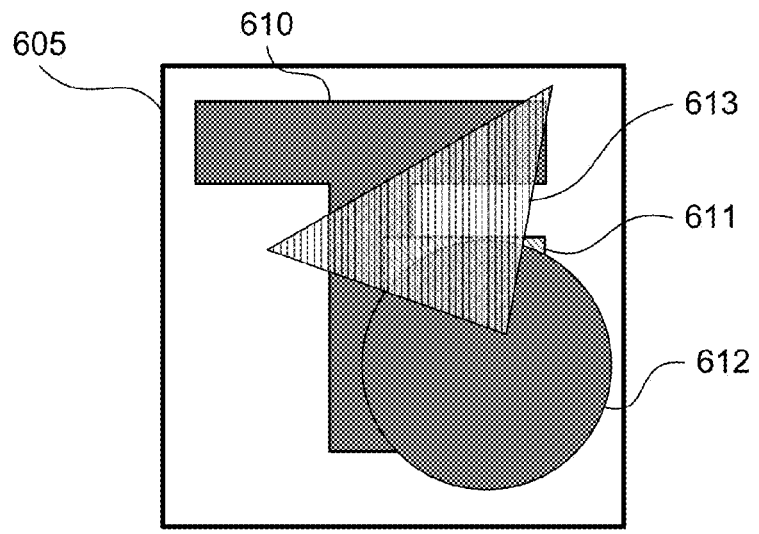
FIGS. 6A and 6B collectively show the splitting of an example page of graphic objects into two z-bands.
Figure 6B:
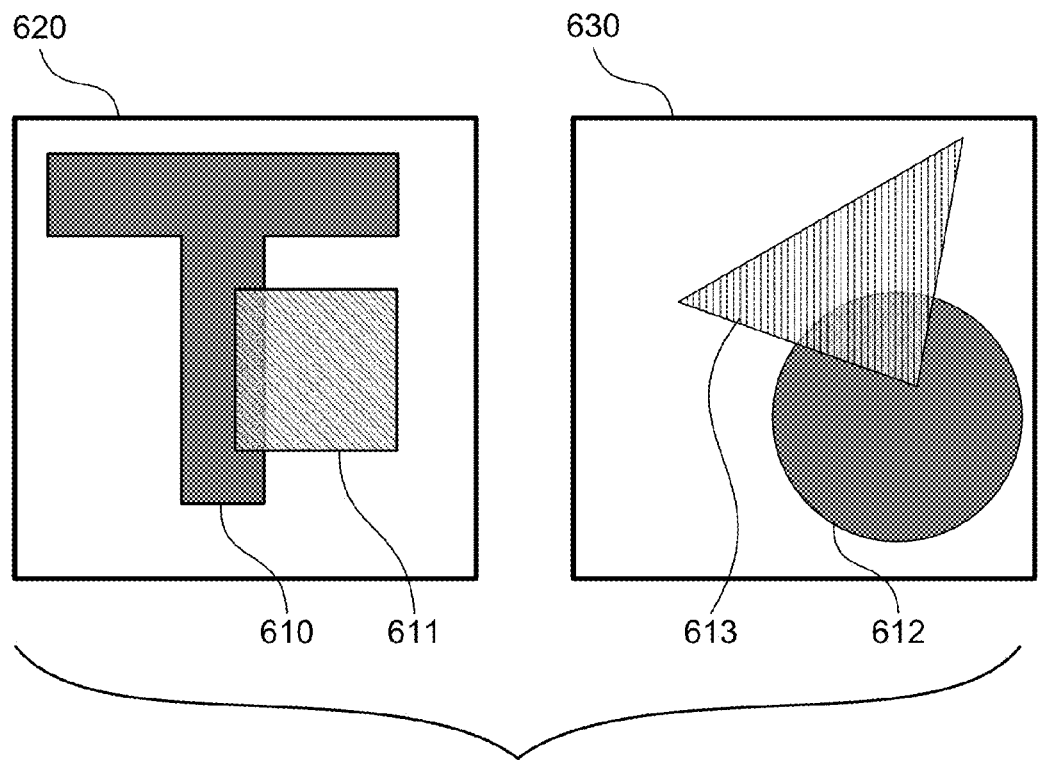

In order to simplify fillmap generation and execute fillmap generation further in parallel, the page description is split into groups of graphic objects with consecutive z order. Such groups of objects are called z-bands. z-bands may be further subdivided into y-bands as described with reference to Fig. C. In one arrangement, each FG task processes a z-band display list of graphic objects to produce a y-band portion of a z-band fillmap. The size of a z-band may be pre-determined to a number of graphic objects. Alternatively, the size of a z-band may be determined during execution according to a criteria such as complexity of an FG task needed to convert the graphic objects in the z-band to a fillmap or set of y-banded fillmaps. FIGS. 6A and 6B show an example of splitting a page of graphic objects into z-bands as will now be described detail.

FIG. 6A shows a page 605 containing four graphic objects 610-613. Graphic object 610 has a smallest z-order, followed by graphic object 611 which has the next highest z-order, followed by graphic object 612, followed by graphic object 613 which has the highest z-order of all of the graphic objects 610-613. Graphic objects 610-613 of the page 605 are split into two z-bands 620 and 630 as shown in FIG. 6B. z-band 620 contains the two graphic objects 610 and 611 with lowest z-order. z-band 630 contains the two graphic objects 612 and 613 with highest z-orders. As described previously with reference to FIG. 4, the two z-bands 620 and 630 are processed by a number of FG tasks either sequentially or in parallel to produce two z-band fillmaps. Each of the z-band fillmaps can be further subdivided into y-band fillmaps. All of the fillmaps are then merged by one or more FM tasks to produce a page fillmap for the page 605. In general, the number of fillmaps for a page varies depending on the page being rendered. The advantage of splitting a page of graphic objects into z-bands is that the graphic objects are processed by multiple FG tasks that are able to be executed in parallel thereby achieving greater parallel execution than in the case of y-banding alone. A raster image processor (RIP) can therefore take advantage of multi-processor and multi-core systems to speed up the RIP process.

Figure 8:
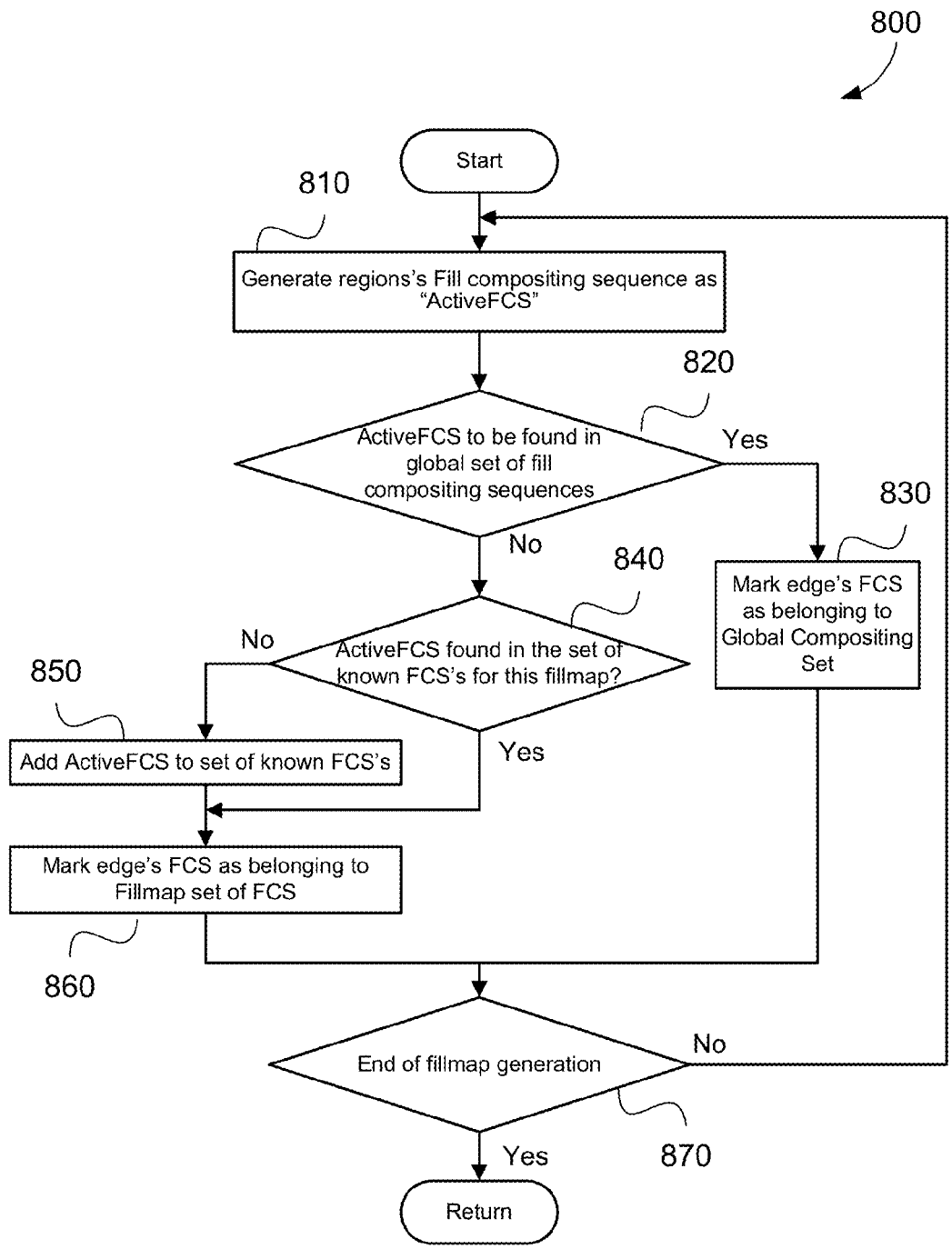
FIG. 8 shows a method of generating a fill compositing.

A method 800 of generating a fill compositing sequence and assigning the fill compositing sequence to a fillmap edge, as performed by an FG task (e.g. FG task 40), will now be described with reference to FIG. 8. The method 800 may be implemented as one or more of the code modules forming the controlling program 181 resident in the memory 190 of the printing system 115 and being controlled in execution by the controller processors 170.

A fill compositing sequence is assigned each time a new edge is created in a fillmap 430, as described previously with reference to FIG. 5. In one arrangement of pixel sequential fillmap generation, pixels of a page are analysed in y-x order and the active fill compositing sequence is updated as a list of levels associated with encountered edges is analysed over analysed pixels. The method 800 updates an active fill compositing sequence (ActiveFCS) repeatedly until the fillmap generation is finished.

The method will be described by way of example with reference to a page of the printable document 201 described above.

The method 800 begins at generating step 810 where a new fillmap edge is created, under execution of the processors 170. The processors 170 are also used at step 810 for generating an active fill compositing sequence which is associated with a variable "ActiveFCS" and stored within memory 190. The active fill compositing sequence is generated based on objects of the page that are currently active. The list of levels that contribute to the active fill compositing sequence is also determined at step 810. Then a list of fill records is obtained. The list of fill records constitutes the active fill compositing sequence. The determined fill compositing sequence will be referenced by a newly created fillmap edge.

Then the method 800 moves to decision step 820, where a decision is made about how to create a reference to a fill compositing sequence generated at step 810 and how to assign the reference to a current fillmap edge. At step 820, the processors 170 are used for determining if the ActiveFCS is to be found in the global compositing set 204*b* configured within memory 190 (i.e., the processors 170 determine if the ActiveFCS has been pre-generated by DL tasks that were previously executed). The decision is made at step 820 based on a predetermined rule. In one arrangement, the predetermined rule is that the single level fill compositing sequences or two-level fill compositing sequences when a given level is composited with the background, are stored in the global compositing set 204*b*.

Other predetermined rules may be used to determine what combinations of levels and fills can be found in the fill compositing sequences in global compositing set 204*b*. For a given page, DL tasks and FG tasks use the same predetermined rule to determine what fill compositing sequences are to be stored in the global compositing set 204*b*. Therefore, a DL task populates the global compositing set 204*b* with all fill compositing sequences that can possibly be referenced by an FG task in step 820.

If the ActiveFCS is present in global compositing set 204*b* at step 820, then execution moves to marking step 830 where the fill compositing sequence reference for the created fillmap edge is set to a compositing sequence found in global compositing set 204*b*. The fill compositing sequence reference is flagged as referencing the global compositing set. In one arrangement, the flagging operation is performed at step 830 by setting a bit in the fill compositing sequence reference to one (1). In such an arrangement, the fill compositing sequence reference comprises a flag pointing to the global compositing set (or global compositing sequence store) if a fillmap region is referenced by the fill compositing sequence from the global compositing set as described below.

It is unnecessary to create a new fill compositing sequence in the global compositing set at step 830, as the fill compositing sequence was generated previously by a DL task in the global compositing set 204*b*. In the case of only one level contributing to ActiveFCS, the corresponding fill compositing sequence in the global compositing set 204*b* has the index identical to the index of the one fill record. Then the FG task uses that fill record index to create a reference to the global compositing set 204*b*. In an alternative arrangement, in the case of multiple levels contributing to the ActiveFCS, the corresponding fill compositing in the global compositing set 204*b* is assigned one of the indices reserved for multi-level fill compositing sequences only. Then the FG task identifies the index of ActiveFCS within the set of reserved indices by means of hash table or other suitable method and uses the identified index as a reference to the global compositing set 204*b*.

In the case of only one level contributing to ActiveFCS, both steps 820 and 830 do not require reading of the global compositing set 204*b* to create the reference to the global compositing set 204*b*. In an alternative arrangement, read access to the global compositing set 204*b* may be needed for searching indices reserved for multi-level fill compositing sequences only. Then, the DL task which is updating the global compositing set 204*b* in parallel, should only be allowed to append the new entries to the global compositing set 204*b*. Memory holding the exiting global compositing set entries should not be released nor reallocated by DL task. With such an arrangement, the FG tasks can safely read data from the existing global compositing set entries. Therefore, at step 820 the processor 170 determine that the ActiveFCS is present in global compositing set 204*b* and at step 830 a reference is created to the fill compositing sequence without performing a (possibly time-consuming) locking operation on the global compositing set 204*b*.

If the ActiveFCS is not to be found in the global compositing set 204*b* at step 820, execution moves to a decision step 840. At the decision step 840, the processors 170 are used to check if the ActiveFCS can be found in the fillmap compositing set associated with the current fillmap being generated. If the ActiveFCS cannot be found in the fillmap compositing set associated with the current fillmap being generated, then the method 800 proceeds to step 850 where the ActiveFCS is added to the fillmap compositing set associated with the current fillmap. Because each FG task in a multi-threaded environment has its own fillmap compositing set exclusively accessible by the assigned thread, it is unnecessary to lock the fillmap compositing set while updating the fillmap compositing set. If ActiveFCS is found in the fillmap compositing set associated with the current fillmap, then step 850 is skipped and the method 800 proceeds from step 840 to marking step 860.

Next, marking step 860 is executed, where the fill compositing sequence reference of the fillmap edge created at step 810 is set to a compositing sequence found in or added to the fillmap compositing set associated with the current fillmap and the reference is flagged as referencing a fillmap compositing set. In one arrangement, the flagging operation is performed at step 860 by setting a bit in the fill compositing sequence reference to zero (0). In such an arrangement, the fill compositing sequence reference comprises a flag pointing to the fillmap compositing set (or local compositing sequence store) if a fillmap region is referenced by the fill compositing sequence from the fillmap compositing set as described below.

Once the fill compositing sequence reference of the created fillmap edge has been marked by either steps 830 or 860, the execution moves to step 870 where it is determined if the fillmap generation process for the current fillmap is finished. If the fillmap generation process for the current fillmap is not finished at step 870, the execution loops back to step 810 to determine the fill compositing sequence to assign to the next fillmap edge. Otherwise, the method 800 (i.e., FG task) completes.

Figure 7:
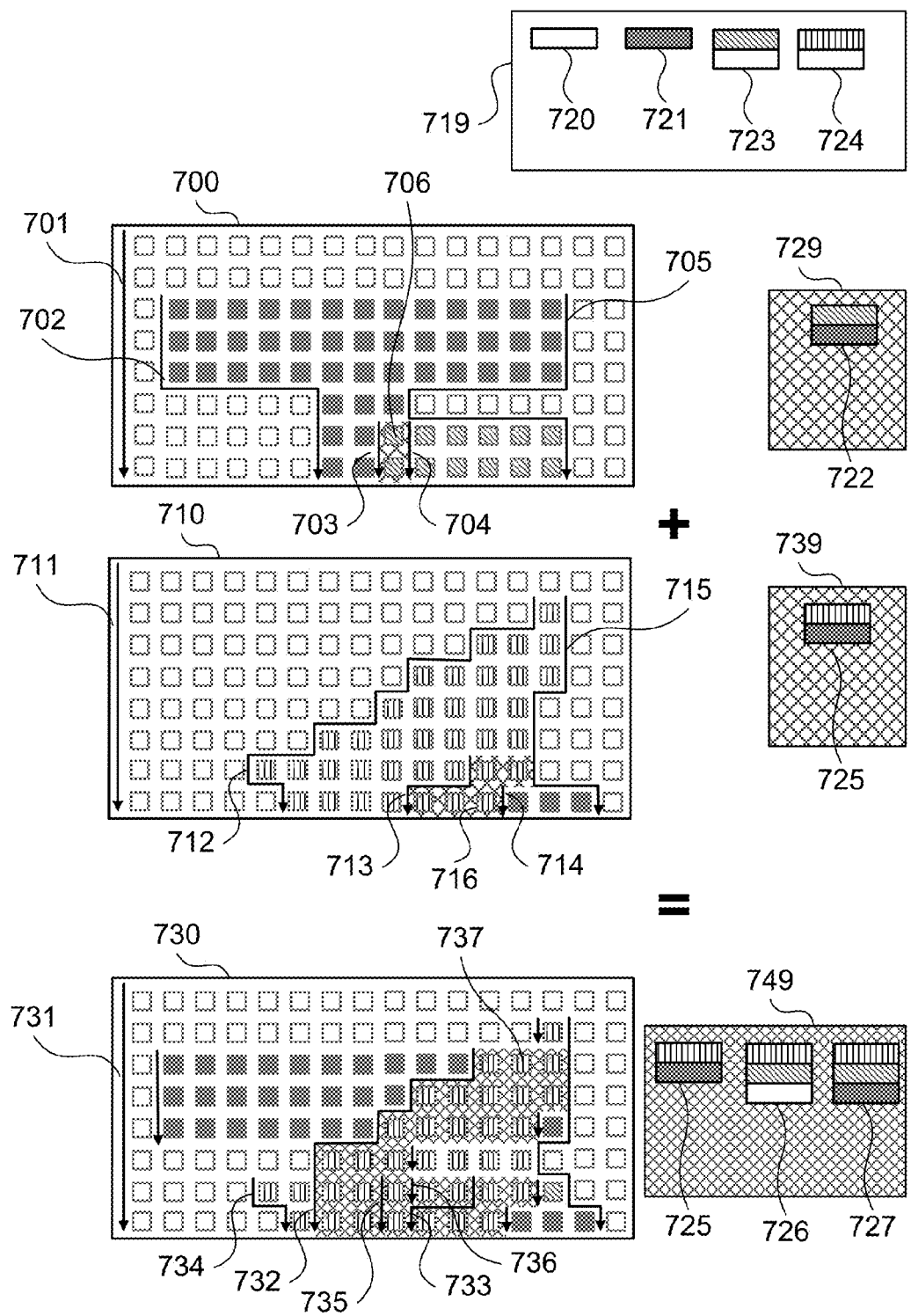
FIG. 7 shows the merging of two fillmap z-bands shown in FIG. 6B.

An example of fillmap merging, as executed by an FM task, will now be described with reference to FIG. 7. Consider the two z-bands 620 and 630 as described previously with reference to FIG. 6B. In the example of FIG. 7, each z-band is divided into two y-bands. Upper y-band fillmaps 700 and 710 of z-bands 620 and 630 respectively are shown in FIG. 7. The y-band fillmaps 700 and 710 are produced by the y-banded fillmap representation generation process as described previously with reference to FIG. 5D. y-banded fillmaps 700 and 710 are representations of part of different z-bands 620 and 630, respectively, of the page 605. Therefore, in one arrangement, the y-banded fillmaps 700 and 710 are generated by different FG tasks, so that two separate fillmap compositing sets 729 and 739 (shown crosshatched in FIG. 7) are generated. The global compositing set 719 for the page 605 is also shown in FIG. 7. The global compositing set 719 has been created during decomposition of the page 605 into display lists by DL tasks.

y-band fillmap 700 of z-band 620 contains only one edge 703 that references a fill compositing sequence in the fillmap compositing set 729, compositing sequence 722 consisting of a transparent diagonally hatched fill and an opaque grey fill. The pixels activated by fill compositing sequences from a fillmap compositing set, such as pixel 706, are marked cross-hatched. The remaining edges reference fill compositing sequences from global compositing set 719. Fillmap edges 701 and 705 activate fill compositing sequence 720 which consists of a background fill record only.

Fillmap edge 702 activates fill compositing sequence 721, which consists of an opaque grey fill. Fillmap edge 704 activates fill compositing sequence 723, which consists of a transparent diagonally hatched fill and a background fill.

y-band fillmap 710 of z-band 630, contains only one edge 713 that references a fill compositing sequence in the fillmap compositing set 739, fill compositing sequence 725 consisting of a transparent vertically hatched fill and an opaque grey fill. The pixels activated by sequences from a fillmap compositing set, such as pixel 716, are marked cross-hatched. The remaining edges reference global compositing set 719. Fillmap edge 711 activates fill compositing sequence 720, which consists of a background fill only. Fillmap edge 712 activates fill compositing sequence 724, which consists of a transparent vertically hatched fill and a background fill. Fillmap edge 714 activates fill compositing sequence 721, which consists of an opaque grey fill. Fillmap edge 715 activates fill compositing sequence 720, which consists of the background fill only.

Once the fillmaps for z-bands 620 and 630 have been generated, for example by an FG task per each y-band, the fillmaps for z-bands 620 and 630 are merged by an FM task to produce a page fillmap for the page 605. The process of merging two or more z-band fillmaps is similar to the process of generating a y-band fillmap generation as described above. That is, edges activating spans of identical fill compositing sequences on consecutive scan lines are joined such that fillmap edges in a resulting fillmap activate regions of identical fill compositing sequences. The fillmap edges of the z-band fillmaps being merged either remain the same in the page fillmap, are split, joined, extended or deleted according to the regions in the merged fillmap. In addition, new edges may be created in the page fillmap that did not exist in any of the z-band fillmaps being merged. In one arrangement, z-band fillmaps are merged by merging all the corresponding y-bands. The fillmap compositing sets of the corresponding y-bands being merged are combined into a new fillmap compositing set.

In one arrangement, when tiled fillmaps are used, z-band fillmaps are merged by merging all corresponding tiles. The fillmap compositing sets of the corresponding y-bands, shared by the fillmap tiles within the y-bands, are combined into a new fillmap compositing set.

The result of merging the y-band fillmaps 700 and 710 and their corresponding fillmap compositing sets 729 and 739 is y-band fillmap 730 and the fillmap compositing set 749 as seen in FIG. 7. Since y-band fillmap 710 represents graphic objects 612 and 613 with the highest z-order, fillmap edges from y-band fillmap 710 are treated as having a higher z-order than fillmap edges from y-band fillmap 700 during the fillmap merge process.

If an edge in the resulting merged fillmap references a fill compositing sequence consisting of a single level or of a single level composited with the background, then the resulting edge references a fill compositing sequence in the global compositing set and no new fill compositing sequence is generated for that fill compositing sequence in the merged fillmap. An example of such an edge is fillmap edge 731 as seen in FIG. 7, activates fill compositing sequence 720. The fill compositing sequence activated by edge 731 is a concatenation of two instances of fill compositing sequence 720 (a background fill), therefore resulting in a background fill. Another example of an edge referencing a fill compositing sequence consisting of a single level or of a single level composited with the background is edge 734 which activates fill compositing sequence 724. The fill compositing sequence activated by edge 734 is a concatenation of fill compositing sequence 724 with fill compositing sequence 720 (a background fill), therefore resulting in the fill compositing sequence 724.

If an edge in the resulting merged fillmap references a fill compositing sequence consisting of multiple levels of which at least two are not the background, then the new compositing sequence is generated in the fillmap compositing set of the merged fillmap, unless the compositing sequence already exists in the fillmap compositing set of the merged fillmap. In the example of y-band fillmap 730 of FIG. 7, there are four such edges, 732, 733, 735 and 736. The pixels activated by the edges 732, 733, 735 and 736, such as pixel 737, are marked as cross-hatched.

Fillmap edges 732 and 733 activate fill compositing sequence 725, which consists of a transparent vertically hatched fill and an opaque grey fill. The fill compositing sequence activated by fillmap edge 732 is a concatenation of fill compositing sequences 724 and 721, resulting in fill compositing sequence 725. A new fill compositing sequence 725 is generated in the fillmap compositing set 749 of the merged fillmap. Edge 732 is assigned a reference to fill compositing sequence 725 in the merged fillmap 730. The fill compositing sequence activated by edge 733 is a concatenation of fill compositing sequences 725 and 723, resulting in fill compositing sequences 725, because the grey fill is opaque. As fill compositing sequence 725 already exists in fillmap compositing set 749, no new fill compositing sequence needs to be generated, and fill compositing sequence 725 can be referenced by both edges 732 and 733.

Fillmap edge 735 activates a new fill compositing sequence 727, which is a concatenation of fill compositing sequences 724 and 722, resulting in a transparent vertically hatched fill, a transparent diagonally hatched fill and an opaque grey fill. A new fill compositing sequence 727 is generated in fillmap compositing set 749 of the merged fillmap. Fillmap edge 736 activates a new fill compositing sequence 726, which is a concatenation of fill compositing sequences 724 and 723, resulting in a transparent vertically hatched fill, a transparent diagonally hatched fill and background fill. A new fill compositing sequence 726 is generated in fillmap compositing set 749.

Fill compositing sequences from the source fillmap compositing sets 729 and 739 are not referenced by any fillmap edge in the merged fillmap 730. Therefore, after merging, the source fillmap compositing sets 729 and 739 are obsolete and can be discarded.

The page fillmap produced by an FM task represents all graphic objects on the page. The page fillmap is equivalent to a fillmap produced by a single FG task for all graphic objects on the page (i.e., as if no z-banding is performed), or by as many FG tasks as number of y-bands (if y-banding is performed).

Figure 9:
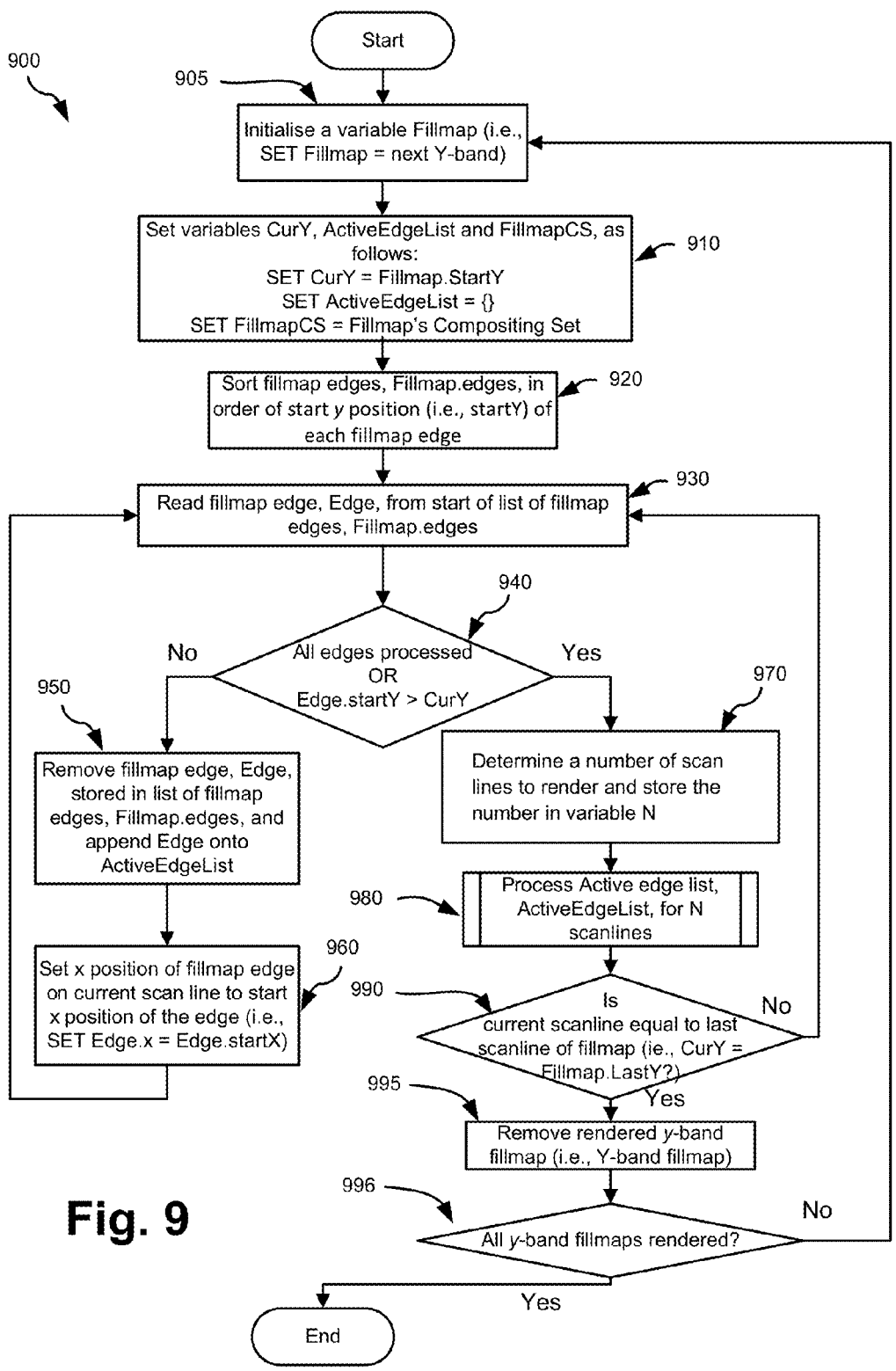
FIG. 9 is a schematic flow diagram showing a method of rendering a fillmap representation of a page to pixels.

FIG. 9 is a schematic flow diagram showing a method 900 of rendering a page described by a region-based representation in the form of the page fillmap 204*a* and global compositing set 204*b*, to pixels. The method 900 is performed by the rendering module 205 which, as described above, may be formed by one or more code modules of the controlling program 181 resident in the memory 190 of the printing system 115 and being controlled in execution by the controller processors 170.

The page fillmap 204*a* can comprise several y-band fillmaps, or fillmaps for several regions of a page that has divided into tiles, each fillmap with a corresponding fillmap compositing set. In one arrangement, there are several y-bands, each y-band having a fillmap compositing set designated for that y-band. In another arrangement, there are several y-bands, each y-band is subdivided into fillmap tiles, fillmap tiles sharing the y-band fillmap compositing set.

The method 900 begins at setting step 905, where a variable, Fillmap, configured in memory 190, is set to a next y-band fillmap ("a current y-band fillmap") (i.e., SET Fillmap=next Y-band) from a collection of y-band fillmaps that form page fillmap 204*a*.

Then in setting step 910, a variable CurY is set to start scan line of the current y-band fillmap (i.e., CurY=Fillmap.StartY), variable ActiveEdgeList which will contain a list of edges active on a current scan line is set to an empty list (i.e., SET ActiveEdgeList={ }), and variable FillmapCS is set to the fillmap compositing set (i.e., SET FillmapCS=Fillmap's Compositing Set) used by the current y-band fillmap.

Step 910 is followed by sorting step 920, where the list of edges contained in the current y-band fillmap (Fillmap.edges) are sorted in order of a start y position (i.e., startY) of each fillmap edge. Edges with the same start y position are further sorted by each the start x position of edge (i.e., start X). Then, in reading step 930, a fillmap edge is read from the list of fillmap edges (Fillmap.edges) and stored in a variable Edge configured within the memory 190.

At decision step 940, the rendering module 205, under execution of the processors 170, determines whether all the fillmap edges in the list of fillmap edges (Fillmap.edges) describing the current y-band fillmap have been processed, or whether the start y position of the currently read fillmap edge stored in variable Edge (Edge.startY) is greater than the value stored in variable CurY (i.e., Edge.startY>CurY). If neither of the conditions of step 940 are satisfied, then the method 900 proceeds to removing step 950. Otherwise, the method 900 proceeds to step 970.

At step 950, the fillmap edge stored in the variable Edge is removed from the list of edges (Fillmap.edges) for the current y-band fillmap. The fillmap edge stored in the variable Edge is also appended onto the active edge list (ActiveEdgeList) configured within memory 190.

Next, in setting step 960, the x position of the fillmap edge on the current scan line is set to the start x position of the edge (i.e., SET Edge.x=Edge.startX). The method 900 then returns to step 930 where the next fillmap edge is read from the list of edges in the fillmap (Fillmap.edges).

If it is determined in decision step 940 that either all the fillmap edges in the list of fillmap edges (Fillmap.edges) describing the current y-band fillmap have been processed, or the start y position of the currently read fillmap edge stored in variable Edge (Edge.startY) is greater than the value stored in variable CurY, then the method 900 proceeds to step 970.

At step 970, the rendering module 205, under execution of the processors 170, determines a number of scan lines to render and stores the number in variable N configured within memory 190. If all the edges in the current y-band fillmap have been processed, then the variable N is set to the number of scan lines remaining on the current y-band fillmap (i.e., the difference between the last scan line of the current y-band fillmap (Fillmap.LastY) and the current scan line, CurY, as follows:

SET $N$=Fillmap.LastY−CurY.

However, if there are still edges in the current y-band fillmap to process, then the variable N is set to the number of scanlines between the current scanline CurY and the scanline on which the currently read fillmap edge commences, as follows:

SET $N$=Edge.startY−CurY.

Once the number N of scan lines has been determined in step 970, the active edge list (ActiveEdgeList) is processed to generate pixels for the next N scanlines and the current scanline is updated in processing step 980. The processing of the N scan lines in step 980 is described below in more detail with reference to FIG. 10 which is a flow diagram showing a method 1000 of generating pixels.

The method 900 continues at next decision step 990, where the rendering module 205, under execution of the processors 170, determines whether the updated current scan line CurY is equal to the last scan line of the current y-band fillmap (Fillmap.LastY) (i.e., CurY=Fillmap.LastY?). If the updated current scan line CurY is equal to the last scan line of the current y-band fillmap (Fillmap.LastY), then the method 900 proceeds to removing step 995. Alternatively, if it is determined in step 990 that the current scan line CurY is less than the last scan line of the current y-band fillmap, then the method 900 returns to step 930 from where the next edge in the current y-band fillmap is read by rendering module 205, under execution of the processors 170.

At step 995, the rendered y-band fillmap is removed from the collection of y-bands that form page fillmap 204a because all scan lines in the y-band have been rendered. The fillmap compositing set (FillmapCS) corresponding to the rendered y-band fillmap can also be removed at step 995. Data corresponding to the rendered y-band fillmap and the corresponding fillmap compositing set (FillmapCS) can be discarded. Then the method 900 proceeds to decision step 996 where it is determined if there are any y-band fillmaps left in the collection of y-bands that form page fillmap 204a, then the execution moves back to step 905 to render the next y-band. Otherwise, the method 900 terminates.

Figure 10:
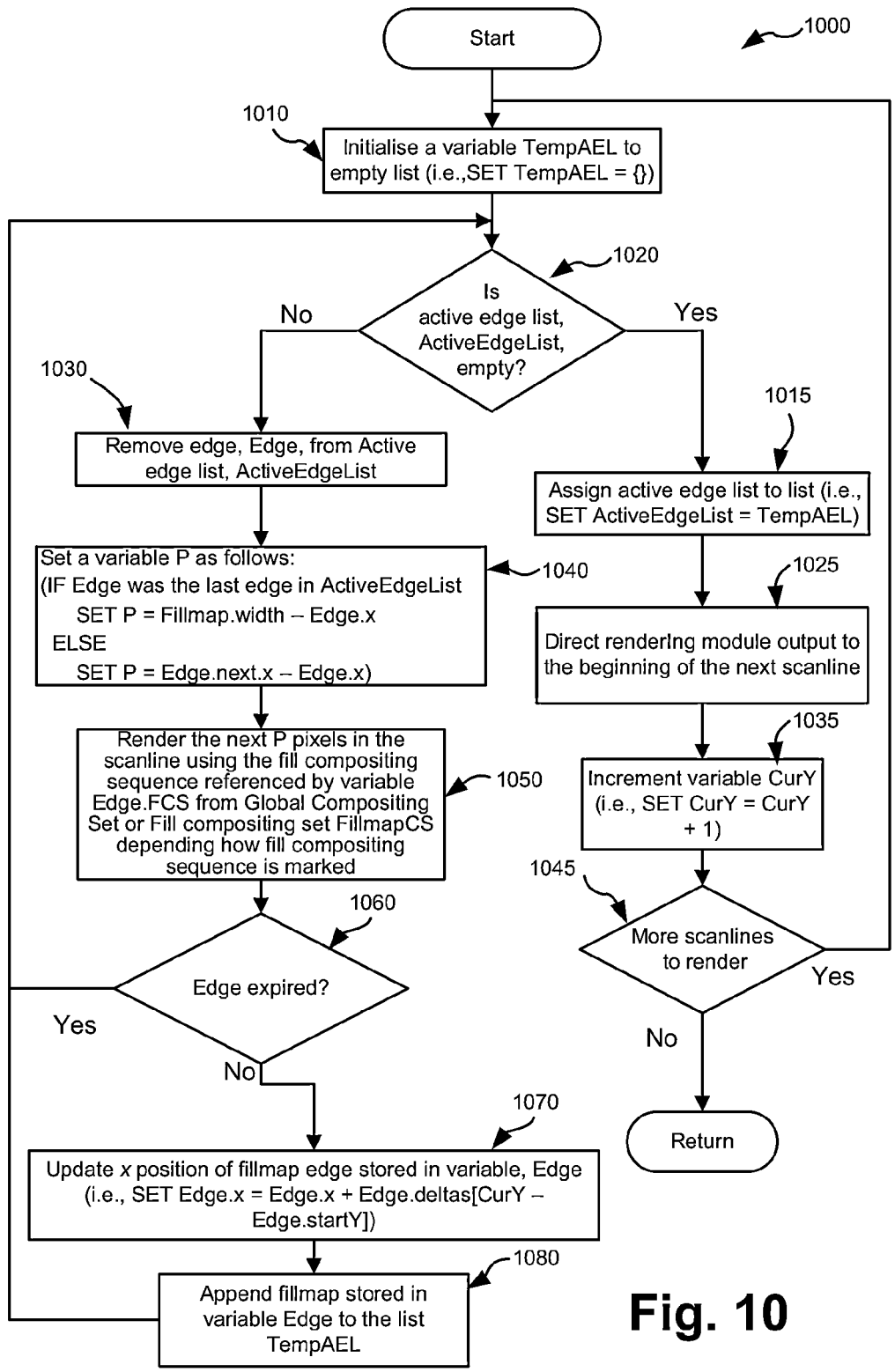
FIG. 10 is a schematic flow diagram showing a method of generating pixels as executed in the method of FIG. 9.

The method 1000 of generating pixels as executed at step 980, where the active edge list is processed for N scan lines, is now described in more detail with reference to FIG. 10. The method 1000 is performed by the rendering module 205 which, as described above, may be formed by one or more code modules of the controlling program 181 resident in the memory 190 of the printing system 115 and being controlled in execution by the controller processors 170.

The method 1000 begins at sub-step 1010 where a variable TempAEL is initialised to an empty list configured within memory 190 (i.e., SET TempAEL={ }). The variable TempAEL contains a list of edges that are progressively removed from the active edge list, ActiveEdgeList, configured in memory 190 when a run of pixels referenced by each edge in the list of edges is rendered but the edge not yet finished, as described below.

Then at decision sub-step 1020, if the active edge list (ActiveEdgeList) is not empty, then the method 1000 proceeds to removing step 1030.

At step 1030, a fillmap edge is removed from the beginning of the active edge list,(ActiveEdgeList) and is stored in a variable Edge configured in memory 190. Next, in setting sub-step 1040, a variable P is set. If the fillmap edge stored in the variable Edge was the last edge in the active edge list (ActiveEdgeList), then the variable P is set as follows:

SET $P$=Fillmap.width−Edge.x.

Alternatively, if the fillmap edge stored in the variable Edge was not the last edge in ActiveEdgeList, then variable P is set as follows:

SET $P$=Edge.next.x−Edge.x.

The method 1000 then proceeds to rendering sub-step 1050, where the next P pixels in the scanline are rendered using the fill compositing sequence referenced by the variable Edge.FCS configured within the memory 190. Variable Edge.FCS is used to store the reference to the fill compositing sequence for the fillmap edge stored in the variable Edge. A bit in the reference to the fill compositing sequence has value of zero (0) or one (1), depending on where the fill compositing sequence is stored, as described previously with reference to FIG. 8.

If the variable Edge.FCS contains a bit zero (0) set at step 860, then the fill compositing sequence referenced by the variable Edge.FCS belongs to the fillmap compositing set. Therefore, the fill compositing sequence is retrieved from the fillmap compositing set FillmapCS. If Edge.FCS contains a bit one (1) set by step 830, then the fill compositing sequence referenced by the variable Edge.FCS belongs to the global compositing set. The fill compositing sequence referenced by the variable Edge.FCS is retrieved from global compositing set 204*b*.

Next, in decision sub-step 1060, it is determined whether the fillmap edge stored in the variable Edge has expired (i.e., if the sequence of all x-values stored in the corresponding deltas table have been examined). If it is determined that the fillmap edge stored in the variable Edge has not expired, then the method 1000 proceeds to setting sub-step 1070. At step 1070, the x position of the fillmap edge stored in the variable Edge is updated for the next scan line. The x position of the fillmap edge stored in the variable Edge is updated at step 1070 as follows:

SET Edge.*x*=Edge.*x*+Edge.deltas[Cur*Y*−Edge.start*Y*].

Processing continues to appending sub-step 1080 where the fillmap edge stored in the variable Edge is appended to the list TempAEL. The method 1000 of step 980 then returns to sub-step 1020 where it is determined whether the active edge list (ActiveEdgeList) is empty.

If it is determined by the rendering module 205 in sub-step 1060 that the fillmap edge stored in the variable Edge has expired, then the method 1000 returns to sub-step 1020.

If it is determined in sub-step 1020 that the active edge list (ActiveEdgeList) is empty, then processing continues to setting sub-step 1015, where variable ActiveEdgeList is assigned the list stored in the variable TempAEL (i.e., SET ActiveEdgeList=TempAEL).

The method 1000 then proceeds to sub-step 1025, where the output of the rendering module 205 (or "renderer") is directed to the beginning of the next scanline.

Next, in setting sub-step 1035, the variable CurY is incremented by setting CurY to CurY+1 (i.e., SET CurY=CurY+1) to advance processing to the next scan line. Processing then continues to decision sub-step 1045 where the rendering module 205, under execution of the processors 170, determines whether there are more scan lines to render. If it is determined in sub-step 1045 that there are more scan lines to render, then processing returns to sub-step 1010 where the variable TempAEL is again initialised to an empty list for the next scan line. Alternatively, if it is determined in sub-step 1045 that there are no more scan lines to render, then the method 1000 concludes and processing returns to step 990 in FIG. 9.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of generating a region-based representation of a document, the method comprising:

generating an object-based representation of the document, the document comprising a plurality of objects;

generating a global compositing sequence using fill data and a compositing operation associated with the plurality of objects independently of regions of overlap between the plurality of objects, the global compositing sequence being stored in a global compositing sequence store; and generating the region-based representation of the document using the object-based representation, the region-based representation comprising references to the global compositing sequence and a local compositing sequence, the local compositing sequence being stored in a local compositing sequence store, the local compositing sequence being determined on a per region basis based on objects contributing to a corresponding region, wherein the region-based representation comprises an indication of whether a region of the region-based representation references the global compositing sequence store or the local compositing sequence store to allow rendering of the region-based representation.

2. The method according to claim 1, wherein the global compositing sequence is generated based on a predetermined rule, the rule being determined based on number of objects contributing to said region.

3. The method according to claim 1, wherein the global compositing sequence is generated based on a predetermined rule, the rule being determined by predicting at least one arrangement of fills in the region-based representation based on knowledge about overlapping ones of said objects.

4. The method according to claim 1, wherein the global compositing sequence is generated based on a predetermined rule, the rule being determined based on number of objects contributing to said region, and wherein in accordance with the predetermined rule, the global compositing sequence is formed using a fill from no more than one contributing object.

5. The method according to claim 1, wherein multiple threads are used to generate the region-based representation, each thread being used to form at least one band of the region-based representation.

6. The method according to claim 5, wherein each thread has read-only access to the global compositing sequence.

7. The method according to claim 1, further comprising storing the local compositing sequence in a local compositing sequence store accessible by a thread assigned to process a band in the region-based representation corresponding to the region.

8. The method according to claim 1, further comprising storing the global compositing sequence in a global compositing sequence store which is accessible by threads to perform a read operation, wherein the global compositing sequence in the global compositing sequence store is accessible by a unique index derived from at least one fill contributing to said global compositing sequence.

9. The method according to claim 1, further comprising storing the global compositing sequence in a global compositing sequence store which is accessible by threads to perform a read operation, wherein the global compositing sequence in the global compositing sequence store is accessible by a unique index derived from at least one fill contributing to said global compositing sequence, and wherein creating a reference to the global compositing sequence for a region further comprises creating an index derived from at least one fill contributing to said region, the created index pointing to the global compositing sequence in the global compositing sequence store.

10. The method according to claim 1, further comprising rendering the region-based representation.

11. The method according to claim 1, further comprising storing the global compositing sequence in a global compositing sequence store which is accessible by threads to perform a read operation, wherein the global compositing sequence in the global compositing sequence store is accessible by a unique index derived from at least one fill contributing to said global compositing sequence, and wherein the reference assigned to the region is used to render the region-based representation.

12. The method according to claim 1, further comprising storing the global compositing sequence in a global compositing sequence store which is accessible by threads to perform a read operation, wherein the global compositing sequence in the global compositing sequence store is accessible by a unique index derived from at least one fill contributing to said global compositing sequence, and wherein the reference comprises a flag pointing to a global compositing sequence store if the region is referenced by the global compositing sequence from the global compositing sequence store.

13. The method according to claim 1, further comprising storing the global compositing sequence in a global compositing sequence store which is accessible by threads to perform a read operation, wherein the global compositing sequence in the global compositing sequence store is accessible by a unique index derived from at least one fill contributing to said global compositing sequence, and wherein a flag points to the local compositing store if the region is referenced by the compositing sequence from the local compositing store.

14. An apparatus for generating a region-based representation of a document, the apparatus comprising:
 means for generating an object-based representation of the document, the document comprising a plurality of objects;
 means for generating a global compositing sequence using fill data and a compositing operation associated with the plurality of objects independently of regions of overlap between the plurality of objects, the global compositing sequence being stored in a global compositing sequence store; and
 means for generating the region-based representation of the document using the object-based representation, the region-based representation comprising references to the global compositing sequence and a local compositing sequence, the local compositing sequence being stored in a local compositing sequence store, the local compositing sequence being determined on a per region basis based on objects contributing to a corresponding region, wherein the region-based representation comprises an indication of whether a region of the region-based representation references the global compositing sequence store or the local compositing sequence store to allow rendering of the region-based representation.

15. A system for generating a region-based representation of a document, the system comprising:
 a memory for storing data and a computer program;
 a processor coupled to the memory for executing the computer program, the computer program comprising instructions for:
  generating an object-based representation of the document, the document comprising a plurality of objects;
  generating a global compositing sequence using fill data and a compositing operation associated with the plurality of objects independently of regions of overlap between the plurality of objects, the global compositing sequence being stored in a global compositing sequence store; and
  generating the region-based representation of the document using the object-based representation, the region-based representation comprising references to the global compositing sequence and a local compositing sequence, the local compositing sequence being stored in a local compositing sequence store, the local compositing sequence being determined on a per region basis based on objects contributing to a corresponding region, wherein the region-based representation comprises an indication of whether a region of the region-based representation references the global compositing sequence store or the local compositing sequence store to allow rendering of the region-based representation.

16. A non-transitory computer readable memory having a program stored thereon for generating a region-based representation of a document, the program comprising:
 code for generating an object-based representation of the document, the document comprising a plurality of objects;
 code for generating a global compositing sequence using fill data and a compositing operation associated with the plurality of objects independently of regions of overlap between of the plurality of objects, the global compositing sequence being stored in a global compositing sequence store; and
 code for generating the region-based representation of the document using the object-based representation, the region-based representation comprising references to the global compositing sequence and a local compositing sequence, the local compositing sequence being stored in a local compositing sequence store, the local compositing sequence being determined on a per region basis based on objects contributing to a corresponding region, wherein the region-based representation comprises an indication of whether a region of the region-based representation references the global compositing sequence store or the local compositing sequence store to allow rendering of the region-based representation.

17. A method of generating an intermediate representation of a document, the method comprising:
 prior to determining an overlap between objects of the document, generating a global compositing sequence using shading data associated with the objects, the global compositing sequence being stored in a global compositing sequence store;
 determining a plurality of regions of the intermediate representation using a spatial arrangement of the objects of the document;
 generating a local compositing sequence for at least one of the generated regions based on overlap between the objects and shading data associated with objects contributing to the at least one generated region the local compositing sequence being stored in a local compositing sequence store; and
 generating the intermediate representation by creating at least one reference to the local compositing sequence and at least one reference to the global compositing sequence for the plurality of regions to allow rendering of the intermediate representation.

18. The method according to claim 17, wherein the intermediate representation comprises an indication of whether a region of the intermediate representation references the global compositing sequence store or the local compositing sequence store.

* * * * *